US010651917B2

(12) United States Patent
John Wilson et al.

(10) Patent No.: US 10,651,917 B2
(45) Date of Patent: May 12, 2020

(54) TRANSMISSION CONFIGURATION INDICATION BASED BEAM SWITCHING

(71) Applicant: QUALCOMM Incorporated, San Diego, CA (US)

(72) Inventors: Makesh Pravin John Wilson, San Diego, CA (US); Tao Luo, San Diego, CA (US); Heechoon Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/244,306

(22) Filed: Jan. 10, 2019

(65) Prior Publication Data
US 2019/0222289 A1    Jul. 18, 2019

Related U.S. Application Data

(60) Provisional application No. 62/617,137, filed on Jan. 12, 2018.

(51) Int. Cl.
*H04B 7/06* (2006.01)
*H04L 5/00* (2006.01)
(Continued)

(52) U.S. Cl.
CPC ......... *H04B 7/0695* (2013.01); *H04B 7/0626* (2013.01); *H04L 1/1607* (2013.01);
(Continued)

(58) Field of Classification Search
CPC . H04W 72/042; H04W 72/046; H04W 16/28; H04B 7/0695; H04B 7/088; H04B 7/0408; H04B 7/0617
(Continued)

(56) References Cited

U.S. PATENT DOCUMENTS

2018/0227886 A1*  8/2018  Chou ................. H04W 72/046
2018/0343653 A1* 11/2018  Guo .................... H04W 4/70
(Continued)

OTHER PUBLICATIONS

"3rd Generation Partnership Project, Technical Specification Group Radio Access Network, NR, Physical Layer Procedures for Data (Release15)", 3GPP Standard, Technical Specification, 3GPP TS 38.214, 3rd Generation Partnership Project (3GPP), Mobile Competence Centre, 650, Route Des Lucioles, F-06921 Sophiaanti Polis Cedex, France, vol. RAN WG1, No. V15.0.0, Jan. 3, 2018 (Jan. 3, 2018), XP051392264, 71 Pages, [retrieved on Jan. 3, 2018].
(Continued)

*Primary Examiner* — Leila Malek
(74) *Attorney, Agent, or Firm* — Linda G. Gunderson; Holland & Hart LLP

(57) ABSTRACT

Transmission configuration indication (TCI) states may be used to indicate beam switching for data beams and/or control beams. A total set of TCI states may be divided into subsets of TCI states. TCI states conveyed via downlink control information (DCI) may thus act as beam switching indications depending on which subset a conveyed TCI state resides. A base station may transmit an indication that such DCI based control beam switching is enabled. Based on whether TCI state (e.g., included in DCI) belongs to a first subset of TCI states or a second subset of TCI states, a wireless device (e.g., that receives the DCI) may trigger a beam switching operation. Beam switching operations may include data beam switching or both data beam switching and control beam switching. The UE may then receive a downlink control channel and a downlink data channel based on the triggered beam switching operation.

30 Claims, 25 Drawing Sheets

(51) Int. Cl.
  *H04W 72/04* (2009.01)
  *H04L 1/16* (2006.01)
(52) U.S. Cl.
  CPC .......... *H04L 5/0053* (2013.01); *H04L 5/0073* (2013.01); *H04L 5/0094* (2013.01); *H04W 72/046* (2013.01); *H04L 5/0048* (2013.01); *H04L 5/0091* (2013.01); *H04W 72/042* (2013.01)
(58) Field of Classification Search
  USPC .......................................................... 375/262
  See application file for complete search history.

(56) References Cited

U.S. PATENT DOCUMENTS

2019/0053072 A1* 2/2019 Kundargi .............. H04B 7/0413
2019/0058561 A1* 2/2019 Ho ....................... H04B 7/0695

OTHER PUBLICATIONS

International Search Report and Written Opinion—PCT/US2019/013294—ISA/EPO—Mar. 7, 2019.

Qualcomm Incorporated: "Remaining Details on QCL", 3GPP Draft; R1-1720672, 3rd Generation Partnership Project (3GPP), Mobile Competence Centre, 650, Route Des Lucioles ; F-06921 Sophia-Antipolis Cedex, France, vol. RAN WG1, No. Reno, Nevada, USA; 20171127-20171201, Nov. 18, 2017 (Nov. 18, 2017), XP051370133, pp. 1-9, Retrieved from the Internet: URL: http://www.3gpp.org/ftp/tsg_ran/WG1_RL1/TSGR1_91/Docs/ [retrieved on Nov. 18, 2017].

Qualcomm Incorporated: "Remaining Details on QCL", 3GPP Draft; R1-1800867, 3rd Generation Partnership Project (3GPP), Mobile Competence Centre, 650, Route Des Lucioles ; F-06921 Sophia-Antipolis Cedex, France, vol. RAN WG1, No. Vancouver, Canada; 20180122-20180126, Jan. 13, 2018 (Jan. 13, 2018), XP051385137, pp. 1-8, Retrieved from the Internet: URL: http://www.3gpp.org/ftp/tsg_ran/WG1_RL1/TSGR1_AH/NR_AH_1801/Docs/ [retrieved on Jan. 13, 2018].

Samsung: "On Beam Management, Measurement and Reporting", 3GPP Draft; R1-1720290_V1, 3rd Generation Partnership Project (3GPP), Mobile Competence Centre, 650, Route Des Lucioles ; F-06921 Sophia-Antipolis Cedex, France, vol. RAN WG1, No. Reno, USA; 20171127-20171201, Nov. 17, 2017 (Nov. 17, 2017), XP051368939, 15 Pages, Retrieved from the Internet: URL: http://www.3gpp.org/ftp/tsg_ran/WG1_RL1/TSGR1_91/Docs/ [retrieved on Nov. 17, 2017].

* cited by examiner

TRANSMISSION CONFIGURATION INDICATION BASED BEAM SWITCHING

CROSS REFERENCES

The present Application for Patent claims the benefit of U.S. Provisional Patent Application No. 62/617,137 by John Wilson, et al., entitled "TRANSMISSION CONFIGURATION INDICATION BASED BEAM SWITCHING," filed Jan. 12, 2018, assigned to the assignee hereof, and expressly incorporated by reference herein.

BACKGROUND

The following relates generally to wireless communication, and more specifically to transmission configuration indication (TCI) based beam switching.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communications systems, a base station and a UE may communicate via one or more directional beams. As transmit beams may be directional, when a UE moves relative to the base station, the transmit and receive beams may need to be switched to different beams. Efficient techniques for communication of such beam switching may thus be desired.

SUMMARY

In some wireless communications systems, a base station may communicate with a user equipment (UE) using multiple antennas. Data streams may be mapped to the antennas using antenna ports. In some cases, a base station may transmit an indication to a UE of the quasi-collocation (QCL) relationships between antenna ports used for downlink communications with the UE. Such an indication may be referred to as a transmission configuration indication (TCI). Different TCI states may correspond to different QCL relationships between antenna ports used for downlink communication with a UE. A base station may transmit downlink control information (DCI) to the UE to update TCI states (e.g., based on current channel conditions).

According to techniques described herein, TCI states may further be used to indicate beam switching for data beams and/or control beams. A total set of TCI states may be divided into subsets of TCI states. TCI states conveyed via DCI may thus act as beam switching indications depending on which subset the conveyed TCI state resides. A base station may transmit an indication that such DCI based control beam switching is enabled. The DCI may include a TCI state, where the TCI state may be associated with a first or second subset of TCI states. The UE may, based on whether the TCI state belongs to the first subset of TCI states or the second subset of TCI states, trigger a beam switching operation. Beam switching operations may include data beam switching or both data beam switching and control beam switching. The UE may then receive a downlink control channel and a downlink data channel based on the triggered beam switching operation.

A method of wireless communication is described. The method may include receiving, from a base station, a first indication that DCI-based control beam switching is enabled. The method may further include receiving, from the base station, DCI indicating a TCI state, where the indicated TCI state is associated with one of a first subset of TCI states or a second subset of TCI states. The method may further include triggering, based on the first indication and whether the indicated TCI state belongs to the first subset of TCI states or the second subset of TCI states, a first beam switching operation or a second beam switching operation, where the first beam switching operation comprises data beam switching and the second beam switching operation comprises data beam switching and control beam switching. The method may further include receiving a downlink control channel and a downlink data channel based on the triggered beam switching operation.

A method of wireless communication is described. The method may include receiving, from a base station, a first indication that DCI-based control beam switching is enabled. The method may further include receiving, from the base station, DCI indicating a TCI state, where the indicated TCI state is associated with a data beam switch or both a control beam switch and a data beam switch. The method may further include triggering, based on the first indication and the TCI state, a first beam switching operation or a second beam switching operation, where the first beam switching operation comprises data beam switching and the second beam switching operation comprises data beam switching and control beam switching. The method may further include receiving a downlink control channel and a downlink data channel based on the triggered beam switching operation.

An apparatus for wireless communication is described. The apparatus may include means for receiving, from a base station, a first indication that DCI-based control beam switching is enabled, and means for receiving, from the base station, DCI indicating a TCI state, where the indicated TCI state is associated with one of a first subset of TCI states or a second subset of TCI states. The apparatus may further include means for triggering, based on the first indication and whether the indicated TCI state belongs to the first subset of TCI states or the second subset of TCI states, a first beam switching operation or a second beam switching operation, where the first beam switching operation comprises data beam switching and the second beam switching operation comprises data beam switching and control beam switching. The apparatus may further include means for receiving a downlink control channel and a downlink data channel based on the triggered beam switching operation.

An apparatus for wireless communication is described. The apparatus may include means for receiving, from a base station, a first indication that DCI-based control beam switching is enabled, and means for receiving, from the base station, DCI indicating a TCI state, where the indicated TCI state is associated with a data beam switch or both a control beam switch and the data beam switch. The apparatus may further include means for triggering, based on the first indication and the TCI state, a first beam switching operation or a second beam switching operation, where the first beam switching operation comprises data beam switching and the second beam switching operation comprises data beam switching and control beam switching. The apparatus may further include means for receiving a downlink control channel and a downlink data channel based on the triggered beam switching operation.

Another apparatus for wireless communication is described. The apparatus may include a processor, memory in electronic communication with the processor, and instructions stored in the memory. The instructions may be operable to cause the processor to receive, from a base station, a first indication that DCI-based control beam switching is enabled, and receive, from the base station, DCI indicating a TCI state, where the indicated TCI state is associated with one of a first subset of TCI states or a second subset of TCI states. The instructions may be further operable to cause the processor to trigger, based on the first indication and whether the indicated TCI state belongs to the first subset of TCI states or the second subset of TCI states, a first beam switching operation or a second beam switching operation, where the first beam switching operation comprises data beam switching and the second beam switching operation comprises data beam switching and control beam switching. The instructions may be further operable to cause the processor to receive a downlink control channel and a downlink data channel based on the triggered beam switching operation.

Another apparatus for wireless communication is described. The apparatus may include a processor, memory in electronic communication with the processor, and instructions stored in the memory. The instructions may be operable to cause the processor to receive, from a base station, a first indication that DCI-based control beam switching is enabled, and receive, from the base station, DCI including a TCI state, where the indicated TCI state is associated with a data beam switch or both a control beam switch and the data beam switch. The instructions may be further operable to cause the processor to trigger, based on the first indication and the TCI state, a first beam switching operation or a second beam switching operation, where the first beam switching operation comprises data beam switching and the second beam switching operation comprises data beam switching and control beam switching. The instructions may be further operable to cause the processor to receive a downlink control channel and a downlink data channel based on the triggered beam switching operation.

A non-transitory computer-readable medium for wireless communication is described. The non-transitory computer-readable medium may include instructions operable to cause a processor to receive, from a base station, a first indication that DCI-based control beam switching is enabled, and receive, from the base station, DCI indicating a TCI state, where the indicated TCI state is associated with one of a first subset of TCI states or a second subset of TCI states. The non-transitory computer-readable medium may further include instructions operable to cause a processor to trigger, based on the first indication and whether the indicated TCI state belongs to the first subset of TCI states or the second subset of TCI states, a first beam switching operation or a second beam switching operation, where the first beam switching operation comprises data beam switching and the second beam switching operation comprises data beam switching and control beam switching. The non-transitory computer-readable medium may further include instructions operable to cause a processor to receive a downlink control channel and a downlink data channel based on the triggered beam switching operation.

A non-transitory computer-readable medium for wireless communication is described. The non-transitory computer-readable medium may include instructions operable to cause a processor to receive, from a base station, a first indication that DCI-based control beam switching is enabled, and receive, from the base station, DCI including a TCI state, where the indicated TCI state is associated with a data beam switch or both a control beam switch and the data beam switch. The non-transitory computer-readable medium may further include instructions operable to cause a processor to trigger, based on the first indication and the TCI state, a first beam switching operation or a second beam switching operation, where the first beam switching operation comprises data beam switching and the second beam switching operation comprises data beam switching and control beam switching. The non-transitory computer-readable medium may further include instructions operable to cause a processor to receive a downlink control channel and a downlink data channel based on the triggered beam switching operation.

In some examples of the methods, apparatuses, and non-transitory computer-readable medium described above, the control beam switching of the second beam switching operation comprises: identifying a QCL relationship between reference signals of the downlink control channel and a reference signal set corresponding to the indicated TCI state.

Some examples of the methods, apparatuses, and non-transitory computer-readable medium described above may further include processes, features, means, or instructions for determining whether the indicated TCI state belongs to a first subset of TCI states or a second subset of TCI states based on a most significant bit (MSB) of the indicated TCI state, where the first subset of TCI states are associated with the data beam switch and the second subset of TCI states are associated with both the control beam switch and the data beam switch.

Some examples of the methods, apparatuses, and non-transitory computer-readable medium described above may further include processes, features, means, or instructions for receiving, from the base station, a second indication that TCI state information in DCI may be enabled. Some examples of the method, apparatus, and non-transitory computer-readable medium described above may further include processes, features, means, or instructions for triggering the first beam switching operation or the second beam switching operation may be further based on the second indication.

In some examples of the methods, apparatuses, and non-transitory computer-readable medium described above, at least one of the first indication or the second indication may be received in radio resource control (RRC) signaling or in a media access control (MAC) control element (MAC-CE).

Some examples of the methods, apparatuses, and non-transitory computer-readable medium described above may further include processes, features, means, or instructions for refraining from performing the second beam switching operation for a period of time defined by a threshold control offset parameter.

Some examples of the methods, apparatuses, and non-transitory computer-readable medium described above may further include processes, features, means, or instructions for receiving the threshold control offset parameter from the base station.

Some examples of the methods, apparatuses, and non-transitory computer-readable medium described above may further include processes, features, means, or instructions for transmitting an acknowledgment (ACK) or negative acknowledgment (NACK) message for the received DCI, where a beginning of the period of time may be defined by a transmission time of the ACK or NACK message for the received DCI.

In some examples of the methods, apparatuses, and non-transitory computer-readable medium described above, the control beam switching of the second beam switching operation includes identifying a QCL relationship between an aperiodic channel state information reference signal (CSI-RS) and a reference signal set corresponding to the indicated TCI state A method of wireless communication is described. The method may include transmitting to a UE a first indication that DCI-based control beam switching is enabled, and transmitting to the UE DCI indicating a TCI state, where the indicated TCI state is associated with one of a first subset of TCI states or a second subset of TCI states. The method may further include triggering, based on the first indication and whether the indicated TCI state belongs to the first subset of TCI states or the second subset of TCI states, a first beam switching operation or a second beam switching operation, where the first beam switching operation comprises data beam switching and the second beam switching operation comprises data beam switching and control beam switching. The method may further include transmitting a downlink control channel and a downlink data channel based on the triggered beam switching operation.

A method of wireless communication is described. The method may include transmitting to a UE a first indication that DCI-based control beam switching is enabled, and transmitting to the UE DCI including a TCI state, where the indicated TCI state is associated with a data beam switch or both a control beam switch and the data beam switch. The method may further include triggering, based on the first indication and the TCI state, a first beam switching operation or a second beam switching operation, where the first beam switching operation comprises data beam switching and the second beam switching operation comprises data beam switching and control beam switching. The method may further include transmitting a downlink control channel and a downlink data channel based on the triggered beam switching operation.

An apparatus for wireless communication is described. The apparatus may include means for transmitting to a UE a first indication that DCI-based control beam switching is enabled, means for transmitting to the UE DCI indicating a TCI state, where the indicated TCI state is associated with one of a first subset of TCI states or a second subset of TCI states, means for triggering, based on the first indication and whether the indicated TCI state belongs to the first subset of TCI states or the second subset of TCI states, a first beam switching operation or a second beam switching operation, where the first beam switching operation comprises data beam switching and the second beam switching operation comprises data beam switching and control beam switching, and means for transmitting a downlink control channel and a downlink data channel based on the triggered beam switching operation.

An apparatus for wireless communication is described. The apparatus may include means for transmitting to a UE a first indication that DCI-based control beam switching is enabled, means for transmitting to the UE DCI including a TCI state, where the indicated TCI state is associated with a data beam switch or both a control beam switch and the data beam switch, means for triggering, based on the first indication and the TCI state, a first beam switching operation or a second beam switching operation, where the first beam switching operation comprises data beam switching and the second beam switching operation comprises data beam switching and control beam switching, and means for transmitting a downlink control channel and a downlink data channel based on the triggered beam switching operation.

Another apparatus for wireless communication is described. The apparatus may include a processor, memory in electronic communication with the processor, and instructions stored in the memory. The instructions may be operable to cause the processor to transmit to a UE a first indication that DCI-based control beam switching is enabled, transmit to the UE DCI indicating a TCI state, where the indicated TCI state is associated with one of a first subset of TCI states or a second subset of TCI states, trigger, based on the first indication and whether the indicated TCI state belongs to the first subset of TCI states or the second subset of TCI states, a first beam switching operation or a second beam switching operation, where the first beam switching operation comprises data beam switching and the second beam switching operation comprises data beam switching and control beam switching, and transmit a downlink control channel and a downlink data channel based on the triggered beam switching operation.

Another apparatus for wireless communication is described. The apparatus may include a processor, memory in electronic communication with the processor, and instructions stored in the memory. The instructions may be operable to cause the processor to transmit to a UE a first indication that DCI-based control beam switching is enabled, transmit to the UE DCI including a TCI state, where the indicated TCI state is associated with a data beam switch or both a control beam switch and the data beam switch, trigger, based on the first indication and the TCI state, a first beam switching operation or a second beam switching operation, where the first beam switching operation comprises data beam switching and the second beam switching operation comprises data beam switching and control beam switching, and transmit a downlink control channel and a downlink data channel based on the triggered beam switching operation.

A non-transitory computer-readable medium for wireless communication is described. The non-transitory computer-readable medium may include instructions operable to cause a processor to transmit to a UE a first indication that DCI-based control beam switching is enabled, transmit to the UE DCI indicating a TCI state, where the indicated TCI state is associated with one of a first subset of TCI states or a second subset of TCI states, trigger, based on the first indication and whether the indicated TCI state belongs to the first subset of TCI states or the second subset of TCI states, a first beam switching operation or a second beam switching operation, where the first beam switching operation comprises data beam switching and the second beam switching operation comprises data beam switching and control beam switching, and transmit a downlink control channel and a downlink data channel based on the triggered beam switching operation.

A non-transitory computer-readable medium for wireless communication is described. The non-transitory computer-readable medium may include instructions operable to cause a processor to transmit to a UE a first indication that DCI-based control beam switching is enabled, transmit to the UE DCI including a TCI state, where the indicated TCI state is associated with a data beam switch or both a control beam switch and the data beam switch, trigger, based on the first indication and the TCI state, a first beam switching operation or a second beam switching operation, where the first beam switching operation comprises data beam switching and the second beam switching operation comprises data beam switching and control beam switching, and transmit a downlink control channel and a downlink data channel based on the triggered beam switching operation.

In some examples of the methods, apparatuses, and non-transitory computer-readable medium described above, the control beam switching of the second beam switching operation comprises: setting a QCL relationship between reference signals of the downlink control channel and a reference signal set corresponding to the indicated TCI state.

In some examples of the methods, apparatuses, and non-transitory computer-readable medium described above, an MSB of the indicated TCI state indicates whether the indicated TCI state belongs to a first subset of TCI states or a second subset of TCI states, wherein the first subset of TCI states are associated with the data beam switch and the second subset of TCI states are associated with both the control beam switch and the data beam switch.

Some examples of the methods, apparatuses, and non-transitory computer-readable medium described above may further include processes, features, means, or instructions for transmitting to the UE a second indication that TCI state information in DCI may be enabled, where triggering the first beam switching operation or the second beam switching operation may be further based on the second indication.

In some examples of the methods, apparatuses, and non-transitory computer-readable medium described above, at least one of the first indication or the second indication may be transmitted using RRC signaling or a MAC-CE.

In some examples of the methods, apparatuses, and non-transitory computer-readable medium described above, the control beam switching of the second beam switching operation includes setting a QCL relationship between an aperiodic channel state information reference signal (CSI-RS) and a reference signal set corresponding to the indicated TCI state

DETAILED DESCRIPTION

Figure 1:
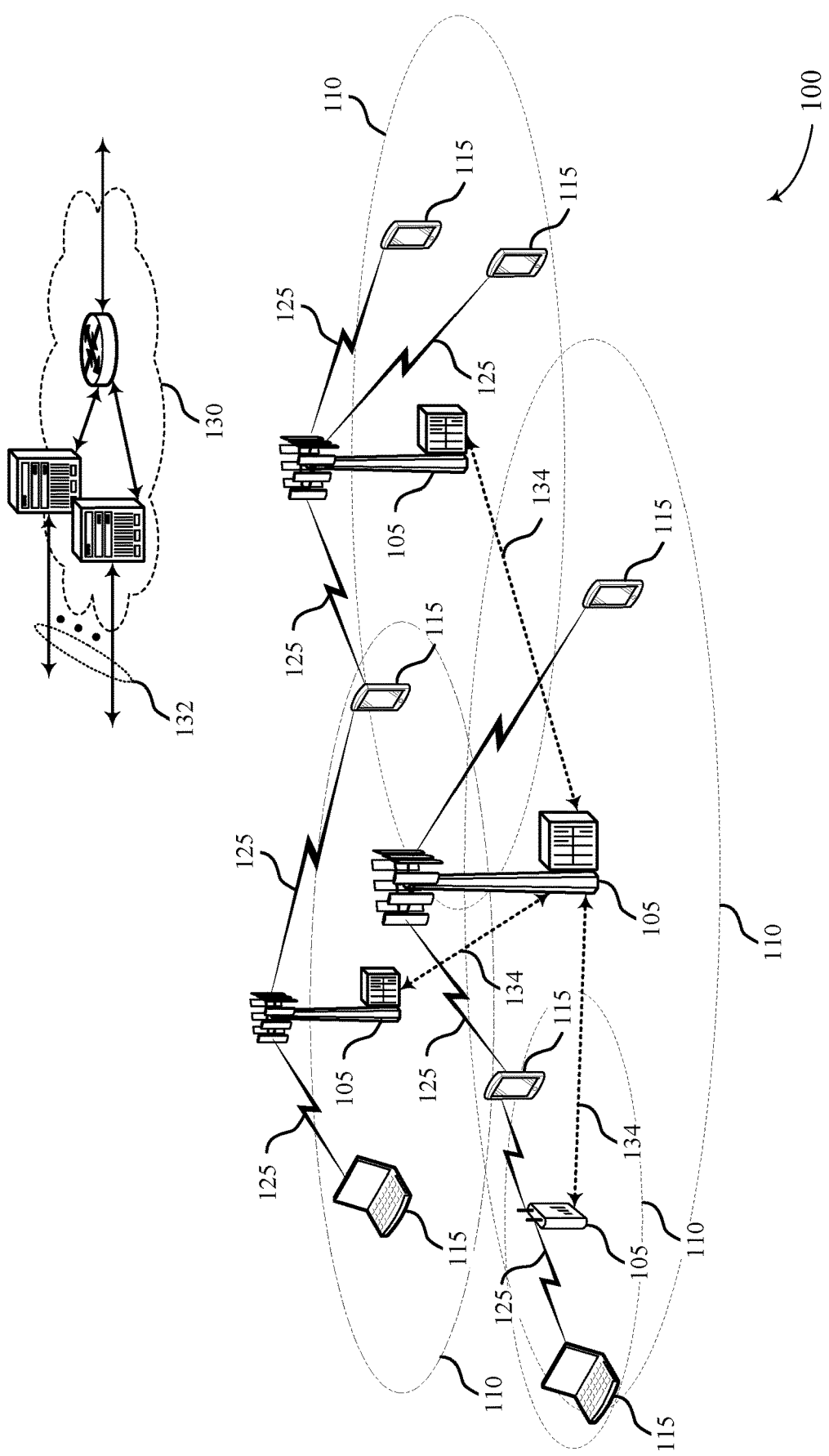
FIGS. 1 and 2 illustrate examples of wireless communications systems that support dynamic transmission configuration indication (TCI) state beam switching in accordance with aspects of the present disclosure.

In some wireless communications systems, a base station may communicate with a user equipment (UE) using multiple antennas. For example, a base station may transmit parallel data streams over respective antennas in order to increase throughput (e.g., as opposed to transmitting the data streams sequentially over the same antenna). Additionally, or alternatively, a base station may transmit a given data stream over multiple antennas simultaneously (e.g., to increase the diversity of the transmissions). In some cases, the use of multiple antennas may be based on the use of one or more antenna ports. An antenna port is a logical entity used to map data streams to antennas. A given antenna port may drive transmissions from one or more antennas (e.g., and resolve signal components received over one or more antennas). Each antenna port may be associated with a reference signal (e.g., which may allow the receiver to distinguish data streams associated with the different antenna ports in a received transmission).

Some antenna ports may be referred to as quasi co-located, meaning that the spatial parameters of a transmission on one antenna port may be inferred from the spatial parameters of another transmission on a different antenna port. Accordingly, a receiving device (e.g., a UE) may be able to perform channel estimation for demodulating data or control information received on a first set of antenna ports based on reference signals received on a second set of antenna ports that are quasi co-located with the first set of antenna ports. Thus, a quasi-collocation (QCL) relationship between antenna ports may improve the chances that a UE may be able to successfully decode a downlink transmission from a base station. In some cases, it may be appropriate for a base station to transmit, to a UE, an indication of which antenna ports are quasi co-located such that the UE may be able to identify additional reference signals to use for channel estimation.

In some aspects, a base station may configure a set of transmission configuration indication (TCI) states to use to indicate, to a UE, QCL relationships between antenna ports used for transmitting downlink signals to the UE. Each TCI state may be associated with a set of reference signals (e.g., synchronization signal blocks (SSBs) or different types of channel state information reference signals (CSI-RSs)), and the TCI state may indicate a QCL relationship between antenna ports used to transmit these reference signals and antenna ports used to transmit data or control information to a UE. As such, when a UE receives an indication of a particular TCI state from a base station (e.g., in downlink control information (DCI) in a transmission time interval (TTI)), the UE may identify that antenna ports used to transmit the reference signals associated with the TCI state are quasi co-located with antenna ports used to transmit data and control information to the UE. Thus, the UE may use the reference signals associated with the TCI state to perform channel estimation for demodulating data or control information received from the base station.

In order to limit the overhead associated with indicating a TCI state to a UE, a base station may be configured to indicate a limited number of TCI states to a UE. For example, the base station may configure M (e.g., 8) TCI states corresponding to different QCL relationships between antenna ports used for downlink communication with a UE, and the base station may use an N-bit indicator (e.g., a 3-bit indicator) to indicate a TCI state to a UE (e.g., where M≥$2^N$). In some cases, however, after a period of time, the originally configured TCI states may no longer correspond to suitable QCL relationships between antenna ports used for transmitting downlink signals to a UE. In such cases, a base station may be configured to use radio resource control (RRC) signaling or a media access control (MAC) control element (MAC-CE) to update the TCI states used to indicate QCL relationships between antenna ports to a UE. However, because channel conditions in a wireless communications system (e.g., in a millimeter wave (mmW) system) may change frequently, the use of RRC signaling or a MAC-CE for updating TCI states may be slow (e.g., static). Thus, the base station may not be able to dynamically adapt these TCI states to changing channel conditions in a wireless communications system, which may be detrimental to the throughput in the wireless communications system.

As described herein, a base station may support efficient techniques for dynamically updating a set of TCI states configured for indicating, to a UE, QCL relationships between antenna ports used for downlink communications with the UE. In particular, a base station may transmit DCI to a UE to update a subset of TCI states configured for indicating QCL relationships between antenna ports used for communicating with the UE. Because DCI may be transmitted relatively frequently (e.g., relative to RRC or MAC-CE signaling), the base station may be able to dynamically adapt these TCI states used to indicate QCL relationships between antenna ports to a UE. A UE may receive the DCI and may update the corresponding TCI states such that these TCI states may correspond to updated QCL relationships between antenna ports as indicated in the DCI.

Additionally, TCI states may be used for DCI based beam switching. According to techniques described herein, TCI states dynamically indicated in DCI may be used to control beam switching for control beams and/or data beams (e.g., physical downlink shared channel (PDSCH)). For example, a first subset of TCI states (e.g., TCI states with a most significant bit (MSB) equal to 0) may be associated with a data beam switch, and a second subset of TCI states (e.g., TCI states with an MSB equal to 1) may be associated with both a control beam switch and a data beam switch. In some cases, a parameter in RRC (e.g., ControlBeamSwitch-in-DCI) may be specified such that, when enabled, a wireless device may identify that subsets of TCI states are being used as beam switching indications. In cases where TCI states are used to enable control beam switching, a threshold may be specified such that a wireless device may switch beams used for control (e.g., control beams) a certain number of slots (e.g., Threshold-Control-Offset slots) after the transmission of a PDSCH acknowledgement (ACK) or a PDSCH negative acknowledgement (NACK) associated with a received downlink grant. Such utilization of TCI framework may reduce overhead and latency associated with beam switching operations.

Aspects of the disclosure are initially described in the context of a wireless communications system. Examples of processes and signaling exchanges that support dynamic TCI state updating, as well as an example TCI based beam switching timeline are then described. Aspects of the disclosure are further illustrated by and described with reference to apparatus diagrams, system diagrams, and flowcharts that relate to TCI based beam switching.

FIG. 1 illustrates an example of a wireless communications system 100 that supports dynamic TCI state beam switching in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Base stations 105 may communicate with the core network 130 and with one another. For example, base stations 105 may interface with the core network 130 through backhaul links 132 (e.g., via an S1 or another interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, and the S-GW may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A MAC layer may perform priority handling and multiplexing of logical channels into transport channels. The MAC layer may also use hybrid automatic repeat request (HARD) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

Wireless communications system 100 may operate in an extremely high frequency (EHF) region of the spectrum (e.g., from 30 GHz to 300 GHz), also known as the millimeter band. In some examples, wireless communications system 100 may support mmW communications between UEs 115 and base stations 105, and EHF antennas of the respective devices may be even smaller and more closely spaced than ultra-high frequency (UHF) antennas. In some cases, this may facilitate use of antenna arrays within a UE 115. However, the propagation of EHF transmissions may be subject to even greater atmospheric attenuation and shorter range than super high frequency (SHF) or UHF transmissions. Techniques disclosed herein may be employed across transmissions that use one or more different frequency regions, and designated use of bands across these frequency regions may differ by country or regulating body.

In some cases, UEs 115 and base stations 105 may support retransmissions of data to increase the likelihood that data is received successfully. HARQ feedback is one technique of increasing the likelihood that data is received correctly over a communication link 125. HARQ may include the transmission of an ACK or a NACK by a receiving device to a transmitting device to indicate to the transmitting device whether a transmission was successfully received. HARQ may also include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams.

Different spatial layers may be associated with different antenna ports used for channel measurement and reporting. An antenna port is a logical entity used to map data streams to antennas. A given antenna port may drive transmissions from one or more antennas (e.g., and resolve signal components received over one or more antennas). Each antenna port may be associated with a reference signal (e.g., which may allow the receiver to distinguish data streams associated with the different antenna ports in a received transmission). In some cases, some antenna ports may be referred to as quasi co-located, meaning that the spatial parameters associated with a transmission on one antenna port may be inferred from the spatial parameters associated with another transmission on a different antenna port.

Accordingly, if a first set of antenna ports is quasi co-located with a second set of antenna ports, a UE 115 may be able to perform channel estimation for demodulating data or control information received on the first set of antenna ports based on reference signals received on the second set of antenna ports. For example, the UE 115 may be able to determine a delay spread, a Doppler shift, etc. associated with a downlink transmission of data or control information on the first set of antenna ports based on the reference signals received on the second set of antenna ports. The UE 115 may then use a channel estimate (i.e., determined based on performing channel estimation as described above) to correctly decode a downlink transmission from a base station 105. Thus, a QCL relationship between antenna ports used for downlink communications between a base station 105 and a UE 115 may improve the chances that the UE 115 may be able to successfully decode a downlink transmission from the base station 105. As such, it may be appropriate for a base station to transmit, to a UE, an indication of which antenna ports are quasi co-located such that the UE may be able to identify additional reference signals to use for channel estimation.

In wireless communications system 100, a base station 105 may configure a set of TCI states that correspond to different QCL relationships between antenna ports used for communication with a UE 115. A TCI state may be associated with a set of reference signals (e.g., SSBs or different types of CSI-RSs), and the TCI state may indicate a QCL relationship between antenna ports used to transmit these reference signals and antenna ports used to transmit data or control information to a UE 115. As such, when a UE 115 receives an indication of a particular TCI state from a base station 105 (e.g., in DCI in a TTI), the UE 115 may identify that antenna ports used to transmit the reference signals associated with the TCI state are quasi co-located with antenna ports used to transmit data and control information to the UE 115. Thus, the UE 115 may use the reference signals associated with the TCI state to perform channel estimation for demodulating data or control information received from the base station 105. For example, the UE 115 may determine a delay spread, Doppler shift, etc. associated with a transmission of data or control information based on the reference signals associated with the TCI state.

In order to limit the overhead associated with indicating a TCI state to a UE 115, a base station 105 may be configured to indicate a limited number of TCI states to a UE. For example, the base station 105 may configure M (e.g., 8) TCI states corresponding to different QCL relationships between antenna ports used for downlink communication with a UE 115, and the base station may use an N-bit indicator (e.g., a 3-bit indicator) to indicate a TCI state to a UE 115 (e.g., where $M \geq 2^N$). In some cases, however, after a period of time, the originally configured TCI states may no longer correspond to suitable QCL relationships between antenna ports used for transmitting downlink signals to a UE 115. For instance, due to changing channel conditions, a base station 105 may identify a new beam for transmitting downlink signals to a UE 115, and the QCL relationships between antenna ports associated with this beam and antenna ports used to transmit reference signals to a UE 115 may change.

In such cases, a base station 105 may be configured to use RRC signaling or a MAC-CE to update the TCI states used to indicate QCL relationships between antenna ports to a UE 115. However, because channel conditions in a wireless communications system (e.g., in a mmW system) may change frequently, the use of RRC or MAC-CE signaling for updating TCI states may be slow (e.g., static). Thus, the base station 105 may not be able to dynamically adapt these TCI states to changing channel conditions in a wireless communications system, which may be detrimental to the throughput in the wireless communications system. Wireless communications system 100 may support efficient techniques for dynamically updating TCI states used to indicate, to a UE 115, QCL relationships between antenna ports used for communications between a base station 105 and the UE 115.

Figure 2:
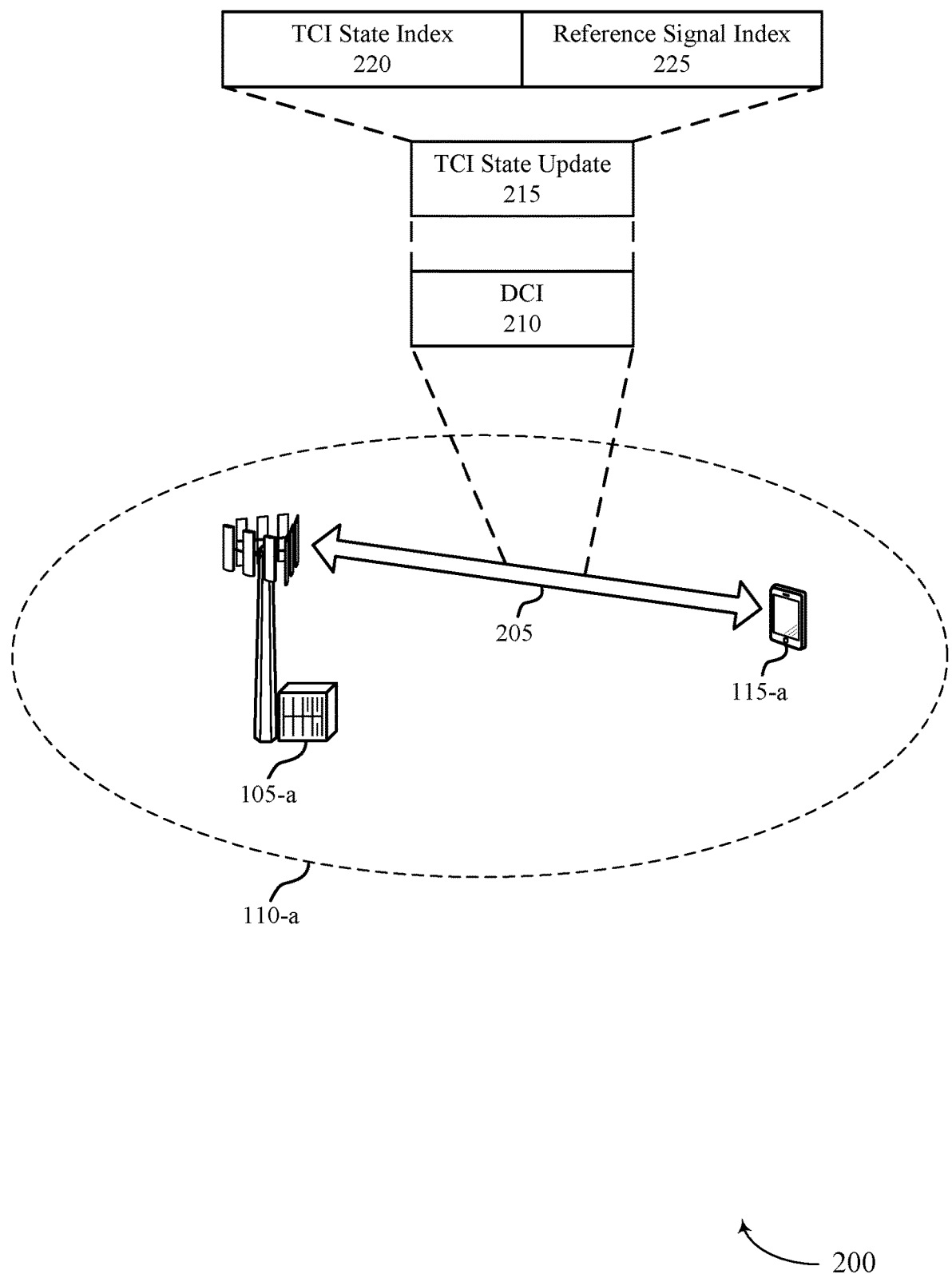

FIG. 2 illustrates an example of a wireless communications system 200 that supports dynamic TCI state beam switching in accordance with aspects of the present disclosure. Wireless communications system 200 includes base station 105-a and UE 115-a, which may be examples of the corresponding devices described with reference to FIG. 1. Base station 105-a may communicate with UEs 115 (including UE 115-a) within coverage area 110-a. For example, base station 105-a may communicate with UE 115-a on resources of a carrier 205. Wireless communications system 200 may implement aspects of wireless communications system 100. For example, wireless communications system may support efficient techniques for dynamically updating TCI states used to indicate, to a UE 115-*a*, QCL relationships between antenna ports used for downlink communications between a base station 105-*a* and the UE 115-*a*. In particular, base station 105-*a* may be configured to update TCI states using DCI.

As described with reference to FIG. 1, base station 105-*a* may configure a set of TCI states that correspond to different QCL relationships between antenna ports used for downlink communications with a UE 115-*a*. Base station 105-*a* may then use these TCI states to indicate, to UE 115-*a*, different QCL relationships between antenna ports used for downlink communications with UE 115-*a*. For example, base station 105-*a* may transmit an indication that a first set of antenna ports used to transmit periodic CSI-RSs to UE 115-*a* are quasi co-located with a second set of antenna ports used to transmit data to the UE 115-*a*. Accordingly, UE 115-*a* may perform channel estimation for demodulating the data received on the second set of antenna ports using the CSI-RSs received on the first set of antenna ports (e.g., in addition to demodulation reference signals (DMRSs) received on the second set of antenna ports).

In some cases, after a period of time, the configured set of TCI states may not indicate suitable QCL relationships between antenna ports used for downlink communications between base station 105-*a* and UE 115-*a* (e.g., due to changing channel conditions). Thus, using the techniques described herein, base station 105-*a* may determine to update a subset of the set of TCI states. As such, base station 105-*a* may transmit a TCI state update 215 in DCI 210 to UE 115-*a* to update the subset of configured TCI states (e.g., based on the current channel conditions). The TCI state update 215 may include a TCI state index 220 that identifies the TCI state being updated. Base station 105-*a* may configure, via RRC signaling, the subset of TCI states (e.g., M') that a base station 105-*a* may be able to update to limit the number of TCI states that may be updated dynamically. Accordingly, the TCI state index 220 may be indicated using a certain number of bits corresponding to the number of TCI states that may be updated dynamically (e.g., $\log_2$ M').

The TCI state update 215 may also include a reference signal index 225 that identifies an updated set of reference signals associated with the TCI state being updated and/or an updated set of QCL parameters associated with each of the reference signals (e.g., delay spread, Doppler shift). In one example, base station 105-*a* may transmit the TCI state update 215 using additional bits available in a DCI message (e.g., an uplink or a downlink grant). In another example, base station 105-*a* may transmit the TCI state update 215 in a dedicated DCI message (e.g., dedicated for transmitting TCI state updates). Once UE 115-*a* receives the TCI state update 215, UE 115-*a* may activate the update by updating a table (e.g., a table available to the UE 115-*a*) that indicates a mapping between TCI states and QCL relationships between antenna ports used for communication with base station 105-*a*. In particular, UE 115-*a* may update the table such that the updated TCI states correspond to the updated QCL relationships indicated by the TCI state update 215.

Further, in some aspects, UE 115-*a* may be configured to transmit an indication to base station 105-*a* as to whether the DCI 210 including the TCI state update 215 was received. In other aspects, UE 115-*a* may be configured to refrain from transmitting an indication to base station 105-*a* as to whether the DCI 210 including the TCI state update 215 was received. And, in yet other aspects, UE 115-*a* may be configured to determine whether to transmit an indication to base station 105-*a* as to whether the DCI 210 including the TCI state update 215 was received based on properties associated with the TCI states being updated. The different aspects introduced above related to providing feedback on whether the DCI 210 including the TCI state update 215 was received are described in further detail below with reference to FIGS. 3A and 3B, which illustrate examples of TTIs 300 used to update TCI states in accordance with s aspects of the present disclosure.

Figure 3A:
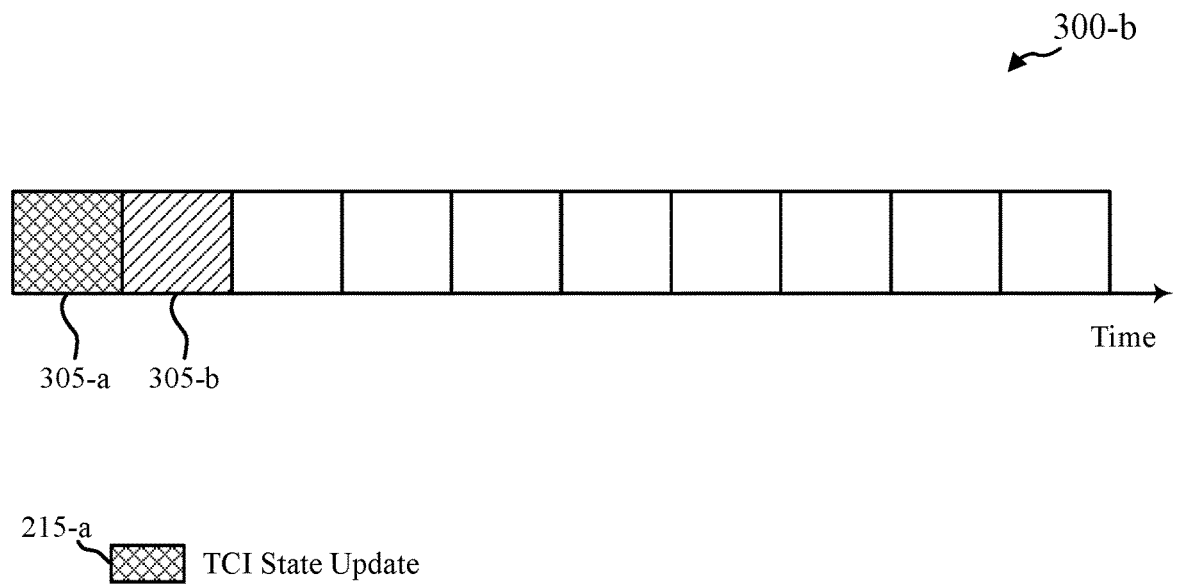
FIGS. 3A and 3B illustrate examples of TTIs used to update TCI states in accordance with aspects of the present disclosure.

In the example of FIG. 3A, UE 115-*a* may be configured to refrain from transmitting an indication to base station 105-*a* as to whether the DCI 210 including the TCI state update 215 was received. Or UE 115-*a* may determine to refrain from transmitting an indication to base station 105-*a* as to whether the DCI 210 including the TCI state update 215 was received based on properties associated with the one or more TCI states being updated. For instance, if the TCI states (e.g., all of the TCI states) being updated are used to indicate QCL relationships between antenna ports used to transmit reference signals and antenna ports used to transmit data (i.e., the TCI states are associated with a data beam), UE 115-*a* may determine to refrain from transmitting an indication to base station 105-*a* as to whether the DCI 210 including the TCI state update 215 was received. In addition, if the TCI state update is minor (e.g., used to update QCL parameters of one reference signal in a set of reference signals associated with a TCI state), UE 115-*a* may determine to refrain from transmitting an indication to base station 105-*a* as to whether the DCI 210 including the TCI state update 215 was received.

Accordingly, when UE 115-*a* receives the TCI state update 215-*a* in TTI 305-*a*, UE 115-*a* may activate the update in TTI 305-*b* (i.e., the UE 115-*a* may activate the update in a following TTI). Thus, the time taken to activate the TCI state update 215-*a* may depend on whether the UE 115-*a* is configured to or determines to transmit the indication to base station 105-*a* as to whether the DCI 210 including the TCI state update 215-*a* was received. For example, the time taken to activate the TCI state update 215-*a* (e.g., one or four TTIs) may be configured by a base station 105-*a* using RRC signaling based on whether the UE 115-*a* is configured to or determines to transmit the indication to base station 105-*a*.

In this example, if UE 115-*a* fails to receive a TCI state update 215 transmitted by base station 105-*a*, UE 115-*a* may continue to communicate with the base station 105-*a* based on previously configured TCI states. As such, if base station 105-*a* transmits an indication of a particular TCI state that was intended to be updated using the TCI state update 215, UE 115-*a* may identify QCL relationships between antenna ports used for downlink communications with base station 105-*a* based on the previously configured TCI state. In such cases, UE 115-*a* may not be able to determine an appropriate channel estimate for demodulating data received from base station 105-*a* (e.g., because UE 115-*a* may be using a previously configured TCI state to identify QCL relationships between antenna ports used for downlink communications with base station 105-*a*). Since UE 115-*a* may not be able to demodulate data received from base station 105-*a*, base station 105-*a* may determine that UE 115-*a* failed to receive the TCI state update 215 (e.g., based on receiving one or more NACKs from UE 115-*a* associated with data transmissions to UE 115-*a*). Accordingly, base station 105-*a* may retransmit the TCI state update 215 to UE 115-*a*.

Figure 3B:
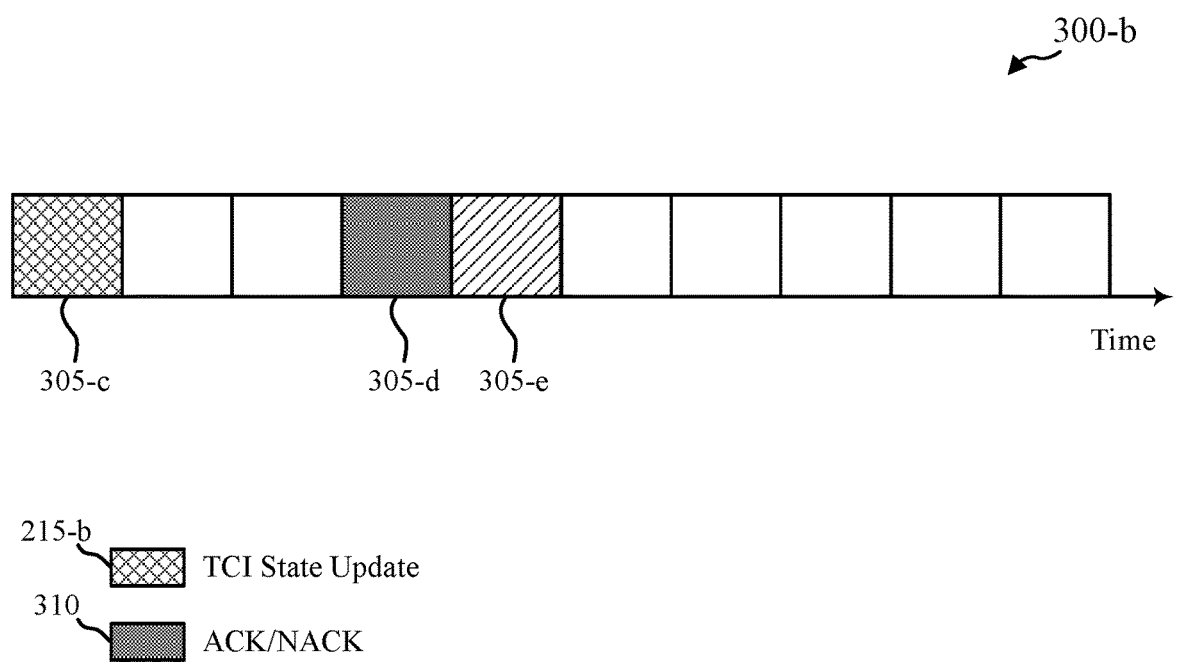

In the example of FIG. 3B, UE 115-*a* may be configured to transmit an indication to base station 105-*a* as to whether the DCI 210 including the TCI state update 215 was received. Or UE 115-*a* may determine to transmit an indication to base station 105-*a* as to whether the DCI 210 including the TCI state update 215 was received based on properties associated with the TCI state being updated. For instance, if at least one of the TCI states being updated is used to indicate QCL relationships between antenna ports used to transmit reference signals and antenna ports used to transmit control information (i.e., the TCI state is associated with a control beam), UE 115-*a* may determine to transmit an indication to base station 105-*a* as to whether the DCI 210 including the TCI state update 215 was received. In addition, if the TCI state update is substantial (e.g., used to update multiple reference signals associated with a TCI state and the QCL parameters associated with these reference signals), UE 115-*a* may determine to refrain from transmitting an indication to base station 105-*a* as to whether the DCI 210 including the TCI state update 215 was received.

Accordingly, when UE 115-*a* receives the TCI state update 215-*b* in TTI 305-*c*, UE 115-*a* may transmit an indication, to base station 105-*a* in TTI 305-*d*, that the DCI 210 including the TCI state update 215-*b* was received. UE 115-*a* may then activate the update in TTI 305-*e* (i.e., the UE 115-*a* may activate the update after transmitting the indication in TTI 305-*d*). Thus, the time taken to activate the TCI state update 215 may depend on whether the UE 115-*a* is configured to or determines to transmit the indication to base station 105-*a* as to whether the DCI 210 including the TCI state update 215-*b* was received. For example, the time taken to activate the TCI state update 215-*a* (e.g., one or four TTIs) may be configured by a base station 105-*a* using RRC signaling based on whether the UE 115-*a* is configured to or determines to transmit the indication to base station 105-*a*.

In this example, UE 115-*a* may transmit an ACK/NACK 310 to base station 105-*a* to indicate whether the DCI 210 including the TCI state update 215-*b* was received. In some cases, UE 115-*a* may be configured to transmit dedicated ACK/NACK feedback to base station 105-*a* to indicate whether the DCI 210 including the TCI state update 215-*b* was received (e.g., ACK/NACK feedback exclusively used for indicating whether the DCI 210 including the TCI state update 215-*b* was received). In other cases, UE 115-*a* may implicitly indicate, to base station 105-*a*, whether the DCI 210 including the TCI state update 215-*b* was received. For instance, UE 115-*a* may transmit ACK/NACK feedback for data received in a data channel from base station 105-*a*. Because the downlink transmission may be scheduled in DCI 210 (e.g., in a downlink grant in DCI 210), base station 105-*a* may determine that DCI 210 was received by UE 115-*a* if the base station 105-*a* receives ACK/NACK for the data (e.g., regardless of whether base station 105-*a* receives an ACK or a NACK for the data).

Figure 4:
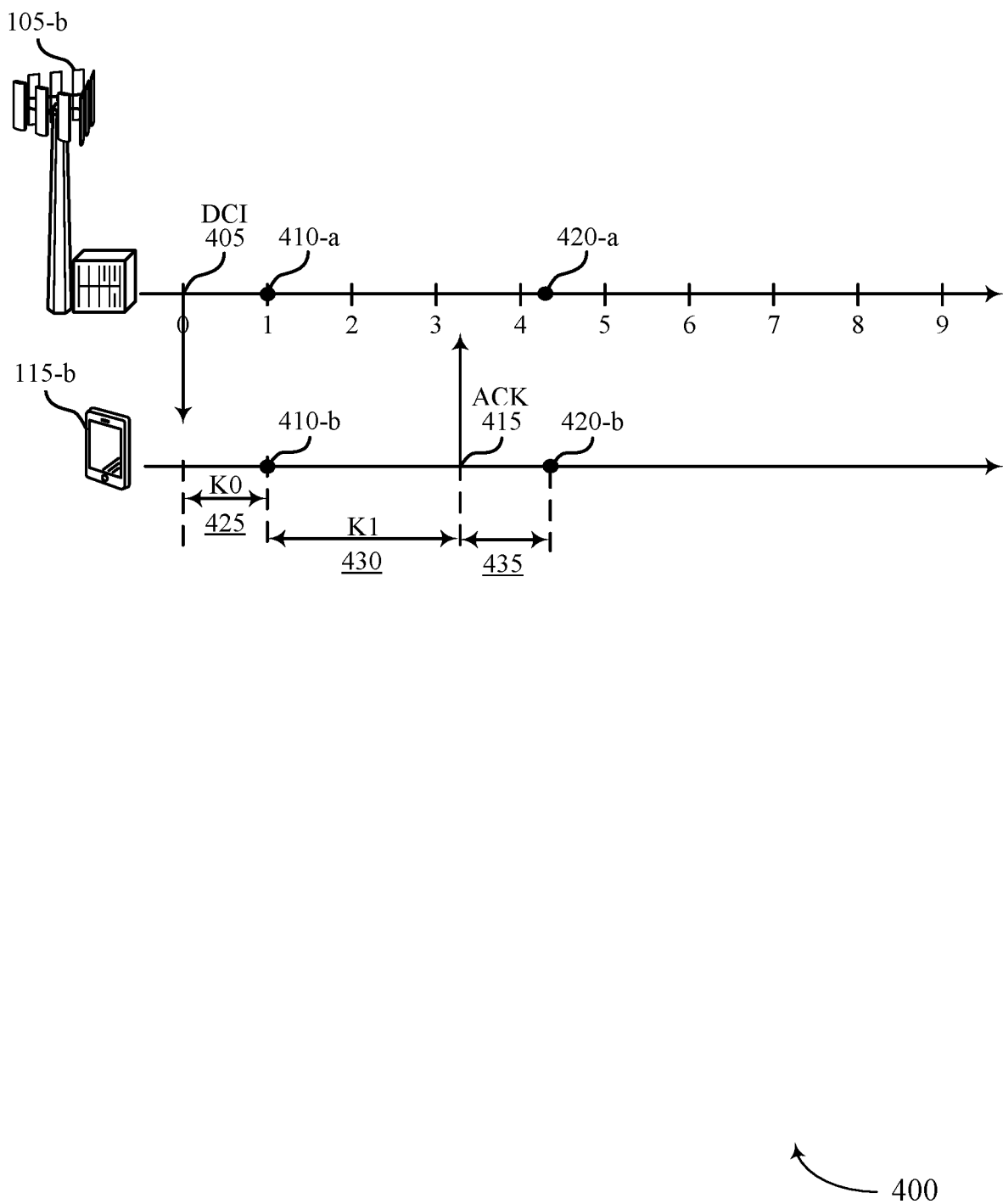
FIG. 4 illustrates an example of a TCI based beam switching timeline in accordance with aspects of the present disclosure.

FIG. 4 illustrates an example of a TCI based beam switching timeline 400 in accordance with aspects of the present disclosure. Timeline 400 may include base station 105-*b* and UE 115-*b*, which may be examples of a base station 105 and a UE 115 as described with reference to FIGS. 1-3.

Data beam switching (e.g., PDSCH beam switching) may be performed dynamically via DCI indication of beam switch. TCI states for PDSCH may be dynamically indicated in DCI. The processing time at a UE (e.g., UE 115-*b*) to decode the grant and switch the beam may be taken into consideration. To account for this processing time, a threshold (e.g., Threshold-Sched-Offset) may be configured. Then an offset between the downlink grant and downlink data is larger than the processing time threshold, the PDSCH may be received using the new beam. For example, at 405 base station 105-*b* may transmit DCI, TCI state, downlink grant etc. to UE 115-*b*. If the offset 425 (e.g., K0) is larger than the processing time threshold (e.g., Threshold-Sched-Offset), a data beam switch may occur (e.g., base station 105-*b* may switch data beam at 410-*a* and UE 115-*a* may switch data beam at 410-*b*), and PDSCH may be received by UE 115-*b* using the new beam.

Additionally, control beam switching may be performed dynamically via DCI indication of beam switch. TCI states for control may be dynamically indicated in DCI. Subsets of TCI states may indicate whether data beam switching is to be performed, or both data beam and control beam switching is to be performed. Generally, M TCI states may be configured in RRC. The M TCI states may be resused for control, and MAC-CE may be utilized to indicate which TCI state may be used for the Control Channel QCL indication. Further, subsets of the M TCI states may be associated with beam switching indications as illustrated below in Table 4.1 (e.g., a first subset of TCI states may indicate a data beam switch, and a second subset of TCI states may indicate a control beam switch and a data beam switch).

TABLE 4.1

| TCI Subset | TCI State | RSs |
|---|---|---|
| TCI Subset 0 | 000 | SSB 3 |
| (Associated with Data | 001 | SSB 8 |
| Beam Switch) | 010 | CSI-RS 10 |
|  | 011 | CSI-RS 20 |
| TCI Subset 1 | 100 | SSB 3 |
| (Associated with | 101 | SSB 8 |
| Control + Data | 110 | SSB 14 |
| Beam Switch) | 111 | SSB 18 |

As shown in Table 4.1, a first TCI subset may include TCI states associated with an MSB equal to 0, and a second TCI subset may include TCI states associated with an MSB equal to 1. Each TCI state may further be associated with a reference signal (RS), signal block (SB), etc. A parameter in RRC (e.g. ControlBeamSwitch-inDCI) may be specified, and if enabled may associate the TCI states with such TCI subsets. That is, when ControlBeamSwitch-inDCI is enabled, if the MSB of an indicated TCI state is 0, the TCI state may indicate a data beam switch. When ControlBeamSwitch-inDCI is enabled, if the MSB of an indicated TCI state is 1, the TCI state may indicate a joint control and data beam switch. Utilization of TCI subsets for beam switch indications, indicated via DCI, may reduce latency associated with beam switching operations.

In some examples, the DCI transmitted by base station 105-*b* at 405 may include a TCI state within TCI subset=0 (e.g., indicating a data beam switch) such that base station 105-*b* may switch data beams at 410-*a* and UE 115-*b* may switch data beams at 410-*b* (e.g., if offset 425 is larger than Threshold-Sched-Offset).

In other examples, the DCI transmitted by base station 105-*b* at 405 may include a TCI state within TCI subset 1 (e.g., indicating both a control beam and data beam switch) such that base station 105-*b* may switch data beams at 410-*a* and UE 115-*b* may switch data beams at 410-*b* (e.g., if offset 425 is larger than Threshold-Sched-Offset) and base station 105-*b* may switch control beams at 420-*a* and UE 115-*b* may switch control beams at 420-*b*. A threshold (e.g., Threshold-control-offset) may be specified or configured for control beam switching such that the UE 115-*b* may switch its control beam according to the threshold. That is, the UE 115-*b* may switch its control beam Threshold-control-offset slots (e.g., offset 435) after the transmission of the PDSCH ACK/NACK for the received downlink grant. For example, when DCI transmitted by base station 105-*b* at 405 may include a TCI state within TCI subset 0, the UE 115-*b* may transmit an ACK in response at 415 after some interval 430 (some delay, K1, in slots between PDSCH reception and corresponding uplink ACK transmission) after the data beam switch at 410-*b*. The UE 115-*b* may then switch control beams at 420-*b* after offset 435 (e.g., some Threshold-control-offset slots after the ACK transmission at 415).

If the TCI-PresentInDCI is set as 'Enabled', the UE shall use the TCI-States according to the value of the 'Transmission Configuration Indication' field in the detected physical downlink control channel (PDCCH) with DCI for determining PDSCH antenna port quasi co-location. The UE may assume that the antenna ports of one DM-RS port group of PDSCH of a serving cell are quasi co-located with the RS(s) in the RS set with respect to the QCL type parameter(s) given by the indicated TCI state if the offset between the reception of the DL DCI and the corresponding PDSCH is equal to or greater than a threshold Threshold-Sched-Offset. For both the case when TCI-PresentInDCI='Enabled' and TCI-PresentInDCI='Disabled' If the offset is less than a threshold, the UE may assume that the antenna ports of one DM-RS port group of PDSCH of a serving cell are quasi co-located based on the TCI state used for PDCCH quasi-colocation indication of the lowest CORESET-ID in the latest slot in which one or more CORESETs are configured for the UE.

If the TCI-PresentinDCI is set as 'Enabled' and Control-BeamSwitch-inDCI is also set as 'Enabled', and UE receives a DL DCI scrambled with a C-RNTI, in the monitored CORESET where the MSB of the indicated TCI state is '1', the UE after a Threshold-Control-Offset from the transmission of an UL ACK/NACK for the received DCI, may assume that the antenna ports of the PDCCH DM-RS of the CORESET will be quasi-collocated with the RS set corresponding to the indicated TCI state.

Figure 5:
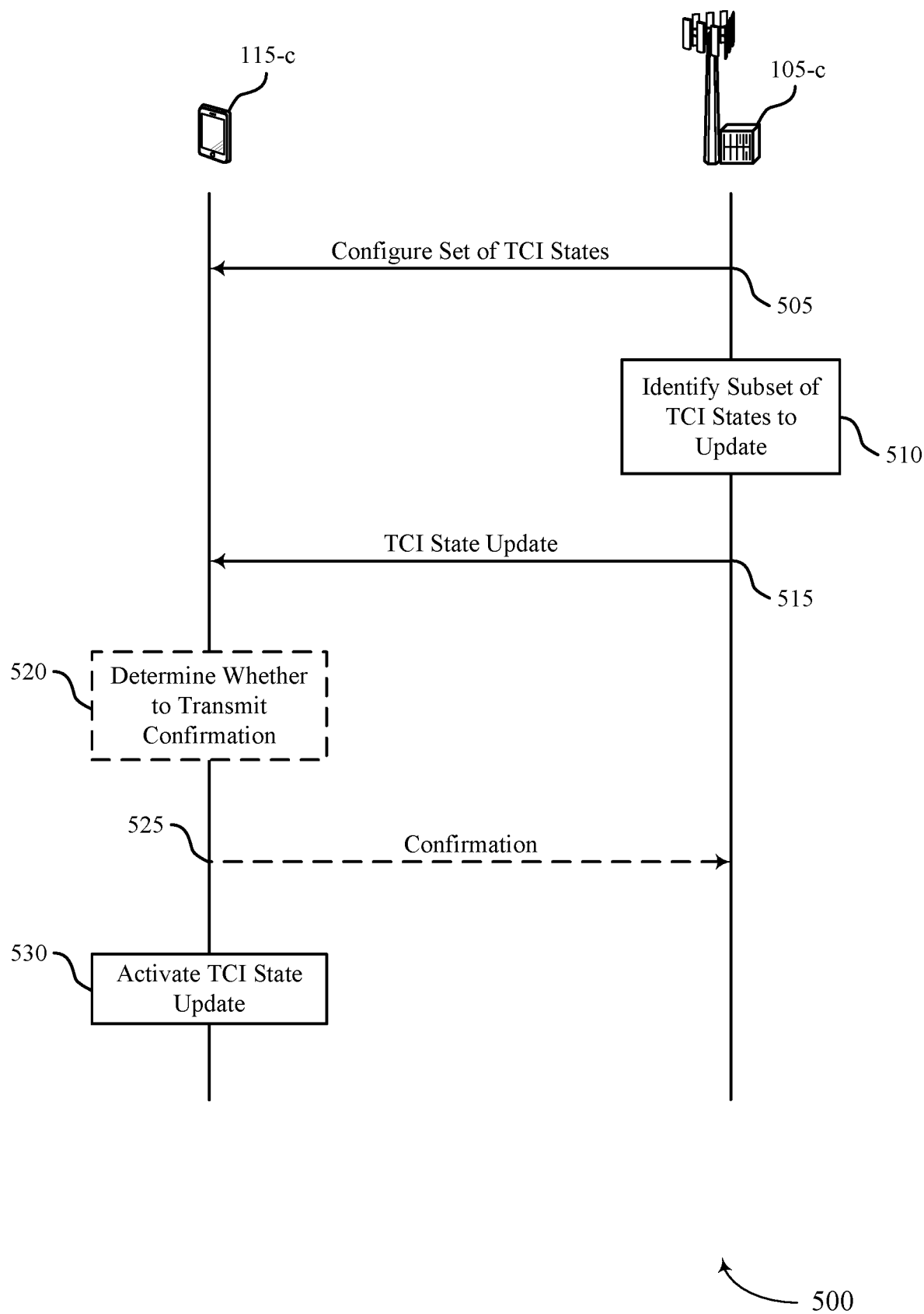
FIG. 5 illustrates an example of a process flow that supports dynamic TCI state updating in accordance with aspects of the present disclosure.

For example, the following field shall be added to the ControlResourceSet IE in 331.
ControlBeamSwitch-InDCI ENUMERATED {enabled} OPTIONAL,
Threshold-Control-Offset ENUMERATED {FFS values} OPTIONAL, FIG. 5 illustrates an example of a process flow 500 that supports dynamic TCI state updating in accordance with aspects of the present disclosure. Process flow 500 illustrates aspects of techniques performed by base station 105-*c*, which may be an example of a base station 105 described with reference to FIGS. 1-4. Process flow 500 also illustrates aspects of techniques performed by a UE 115-*c*, which may be an example of a UE 115 described with reference to FIGS. 1-4.

At 505, base station 105-*c* may transmit, to UE 115-*c*, an indication of a set of TCI states that indicate QCL relationships between antenna ports used for communicating with UE 115-*c*. The indication may be transmitted in RRC signaling or in a MAC-CE. At 510, base station 105-*c* may identify a subset of the set of TCI states to update. Accordingly, at 515, base station 105-*c* may transmit DCI to UE 115-*c* that identifies the subset of the set of TCI states to update and the updated QCL relationships corresponding to the TCI states being updated. In some cases, base station 105-*c* may transmit the DCI in a PDCCH. In other cases, base station 105-*b* may transmit the DCI in a MAC-CE in a PDCCH and a PDSCH.

UE 115-*c* may receive the DCI indicating the update to the subset of the set of TCI states, and, at 520, UE 115-*c* may determine whether to transmit, to base station 105-*c*, an indication as to whether the DCI including the TCI state update was received. For instance, UE 115-*c* may determine whether to transmit the indication based on a configuration at the UE 115-*c* indicating whether to transmit the indication or based on properties associated with the subset of the set of TCI states to be updated. In some examples, UE 115-*c* may determine to refrain from transmitting the indication as to whether the DCI was received, and UE 115-*c* may refrain from transmitting the indication. In other examples, UE 115-*c* may determine to transmit the indication as to whether the DCI was received, and, at 525, UE 115-*c* may transmit the indication. At 530, UE 115-*c* may activate the TCI state update for communication with base station 105-*c*.

UE 115-*c* may then communicate with base station 105-*c* based on the updated subset of the set of TCI states. For example, if UE 115-*c* receives an indication of an updated TCI state in a DCI, UE 115-*c* may identify updated QCL relationships between antenna ports based on the updated TCI state. Specifically, UE 115-*c* may identify one or more reference signals associated with the TCI state, and the antenna ports used to transmit the one or more reference signals may be quasi co-located with antenna ports used to transmit data or control information to the UE 115-*c*. The one or more reference signals may include SSBs, periodic CSI-RSs, aperiodic CSI-RSs, or semi-persistent CSI-RSs. Thus, UE 115-*c* may perform channel estimation based on the one or more reference signals associated with the TCI state. UE 115-*c* may then demodulate the data or control information received from base station 105-*c* based on the channel estimation.

Figure 6:
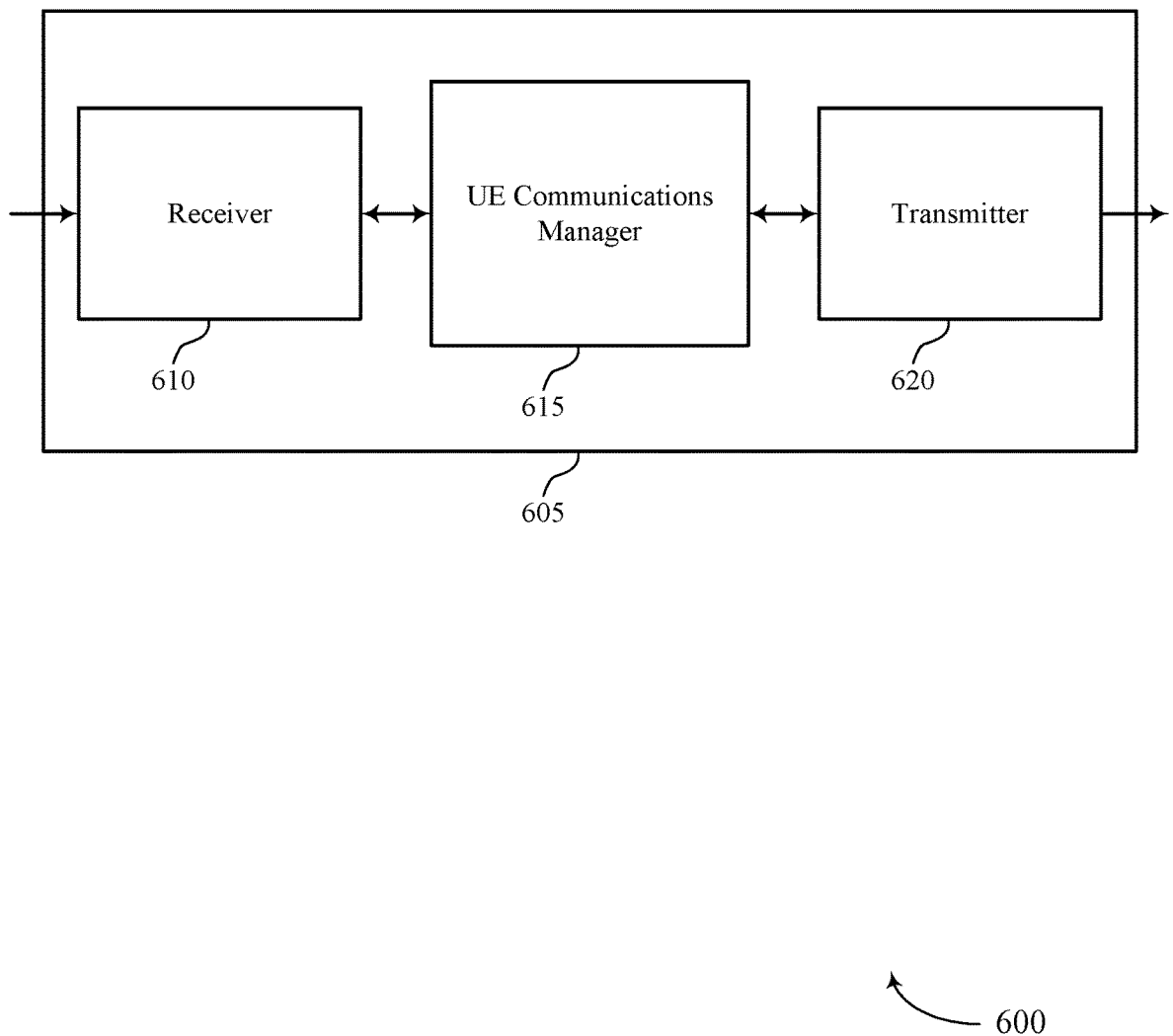
FIG. 6-8 show block diagrams of a device that supports dynamic TCI state updating in accordance with aspects of the present disclosure.

FIG. 6 shows a block diagram 600 of a wireless device 605 that supports dynamic TCI state updating in accordance with aspects of the present disclosure. Wireless device 605 may be an example of aspects of a UE 115 as described herein. Wireless device 605 may include receiver 610, UE communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to dynamic TCI state updating, etc.). Information may be passed on to other components of the device. The receiver 610 may be an example of aspects of the transceiver 935 described with reference to FIG. 9. The receiver 610 may utilize a single antenna or a set of antennas.

UE communications manager 615 may be an example of aspects of the UE communications manager 815 described with reference to FIG. 8. UE communications manager 615 and/or at least some of its various sub-components may be implemented in hardware, software executed by a processor, firmware, or any combination thereof. If implemented in software executed by a processor, the functions of the UE communications manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE communications manager 615 and/or at least some of its various sub-components may be physically located at various positions, including being distributed such that portions of functions are implemented at different physical locations by one or more physical devices. In some examples, UE communications manager 615 and/or at least some of its various sub-components may be a separate and distinct component in accordance with various aspects of the present disclosure. In other examples, UE communications manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 615 may identify a set of TCI states that indicate QCL relationships between antenna ports used for communicating with a base station, receive, from the base station, DCI indicating an update to a subset of the set of TCI states, the updated subset of the set of TCI states indicating updated QCL relationships between antenna ports used for communicating with the base station, and communicate with the base station based on the updated subset of the set of TCI states.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may utilize a single antenna or a set of antennas.

Figure 7:
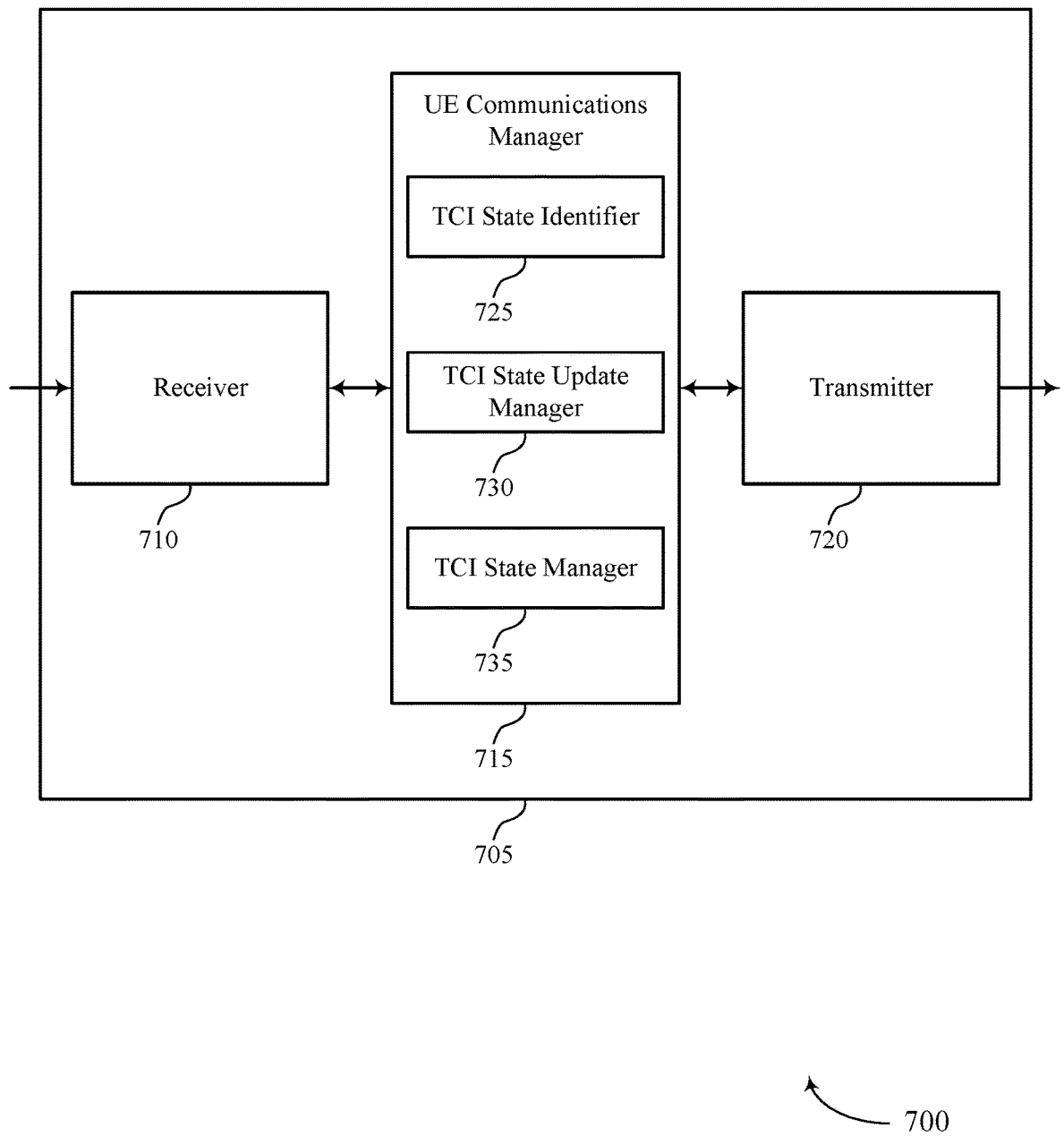

FIG. 7 shows a block diagram 700 of a wireless device 705 that supports dynamic TCI state updating in accordance with aspects of the present disclosure. Wireless device 705 may be an example of aspects of a wireless device 605 or a UE 115 as described with reference to FIG. 6. Wireless device 705 may include receiver 710, UE communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to dynamic TCI state updating, etc.). Information may be passed on to other components of the device. The receiver 710 may be an example of aspects of the transceiver 935 described with reference to FIG. 9. The receiver 710 may utilize a single antenna or a set of antennas.

UE communications manager 715 may be an example of aspects of the UE communications manager 815 described with reference to FIG. 8. UE communications manager 715 may include TCI state identifier 725, TCI state update manager 730, and TCI state manager 735.

TCI state identifier 725 may identify a set of TCI states that indicate QCL relationships between antenna ports used for communicating with a base station. In some cases, TCI state identifier 725 may receive, from the base station, an indication of the set of TCI states that indicate QCL relationships between antenna ports used for communicating with the base station. In some cases, the indication is received in RRC signaling or in a MAC-CE. TCI state update manager 730 may receive, from the base station, DCI indicating an update to a subset of the set of TCI states, the updated subset of the set of TCI states indicating updated QCL relationships between antenna ports used for communicating with the base station. In some cases, the DCI is received in a PDCCH. In some cases, the DCI is received in a MAC-CE in a PDCCH and a PDSCH.

TCI state manager 735 may communicate with the base station based on the updated subset of the set of TCI states. In some cases, TCI state manager 735 may receive, from the base station, an indication of a TCI state in a DCI message in a TTI, the TCI state indicating QCL relationships between antenna ports used for communicating with the base station in the TTI. In some cases, the TCI state is associated with one or more reference signals, and the antenna ports used to transmit the one or more reference signals in the TTI are quasi co-located with antenna ports used to transmit data to the UE in the TTI. In some cases, the TCI state is associated with one or more reference signals, and the antenna ports used to transmit the one or more reference signals are quasi co-located with antenna ports used to transmit control information to the UE in the TTI. In some cases, the one or more reference signals include SSBs, periodic CSI-RSs, aperiodic CSI-RSs, semi-persistent CSI-RSs, or any combination thereof.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
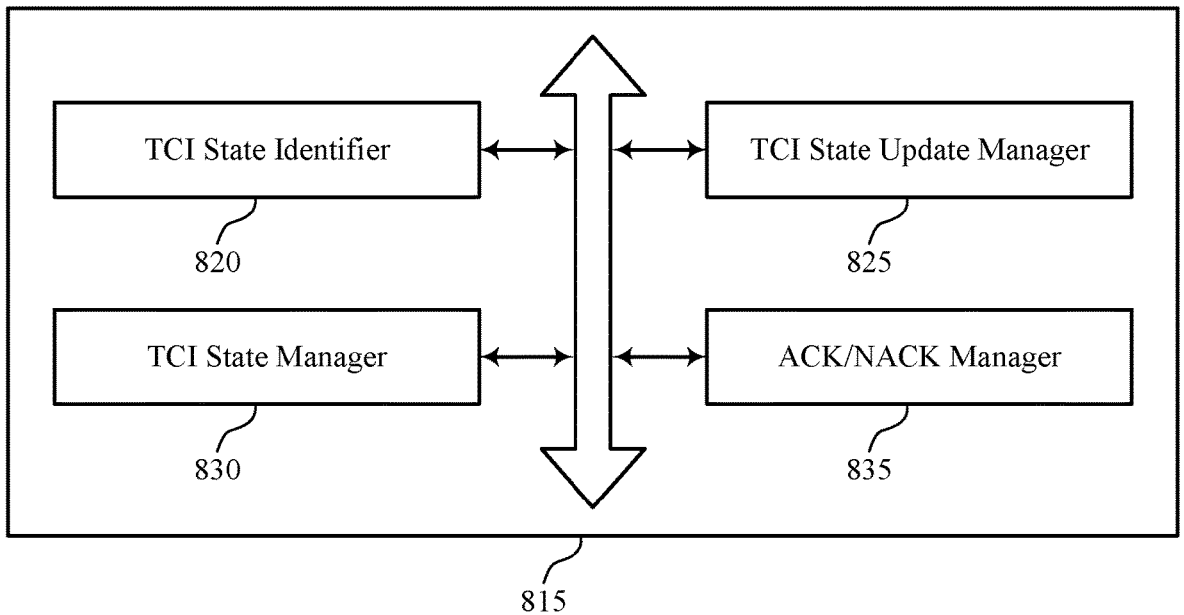

FIG. 8 shows a block diagram 800 of a UE communications manager 815 that supports dynamic TCI state updating in accordance with aspects of the present disclosure. The UE communications manager 815 may be an example of aspects of a UE communications manager 615, a UE communications manager 715, or a UE communications manager 815 described with reference to FIGS. 6, 7, and 8. The UE communications manager 815 may include TCI state identifier 820, TCI state update manager 825, TCI state manager 830, and ACK/NACK manager 835. Each of these modules may communicate, directly or indirectly, with one another (e.g., via one or more buses).

TCI state identifier 820 may identify a set of TCI states that indicate QCL relationships between antenna ports used for communicating with a base station. In some cases, TCI state identifier 820 may receive, from the base station, an indication of the set of TCI states that indicate QCL relationships between antenna ports used for communicating with the base station. In some cases, the indication is received in RRC signaling or in a MAC-CE. TCI state update manager 825 may receive, from the base station, DCI indicating an update to a subset of the set of TCI states, the updated subset of the set of TCI states indicating updated QCL relationships between antenna ports used for communicating with the base station. In some cases, the DCI is received in a PDCCH. In some cases, the DCI is received in a MAC-CE in a PDCCH and a PDSCH.

TCI state manager 830 may communicate with the base station based on the updated subset of the set of TCI states. In some cases, TCI state manager 830 may receive, from the base station, an indication of a TCI state in a DCI message in a TTI, the TCI state indicating QCL relationships between antenna ports used for communicating with the base station in the TTI. In some cases, the TCI state is associated with one or more reference signals, and the antenna ports used to transmit the one or more reference signals in the TTI are quasi co-located with antenna ports used to transmit data to the UE in the TTI. In some cases, the TCI state is associated with one or more reference signals, and the antenna ports used to transmit the one or more reference signals are quasi co-located with antenna ports used to transmit control information to the UE in the TTI. In some cases, the one or more reference signals include SSBs, periodic CSI-RSs, aperiodic CSI-RSs, semi-persistent CSI-RSs, or any combination thereof.

ACK/NACK manager 835 may determine whether to transmit an indication as to whether the DCI was received, the determining based on the subset of the set of TCI states to be updated. In some cases, ACK/NACK manager 835 may transmit, to the base station, an indication as to whether the DCI was received based on the determining. In some cases, ACK/NACK manager 835 may refrain from transmitting, to the base station, an indication as to whether the DCI was received based on the determining. In some cases, a time period associated with activating the updated subset of the set of TCI states is based on the determining.

Figure 9:
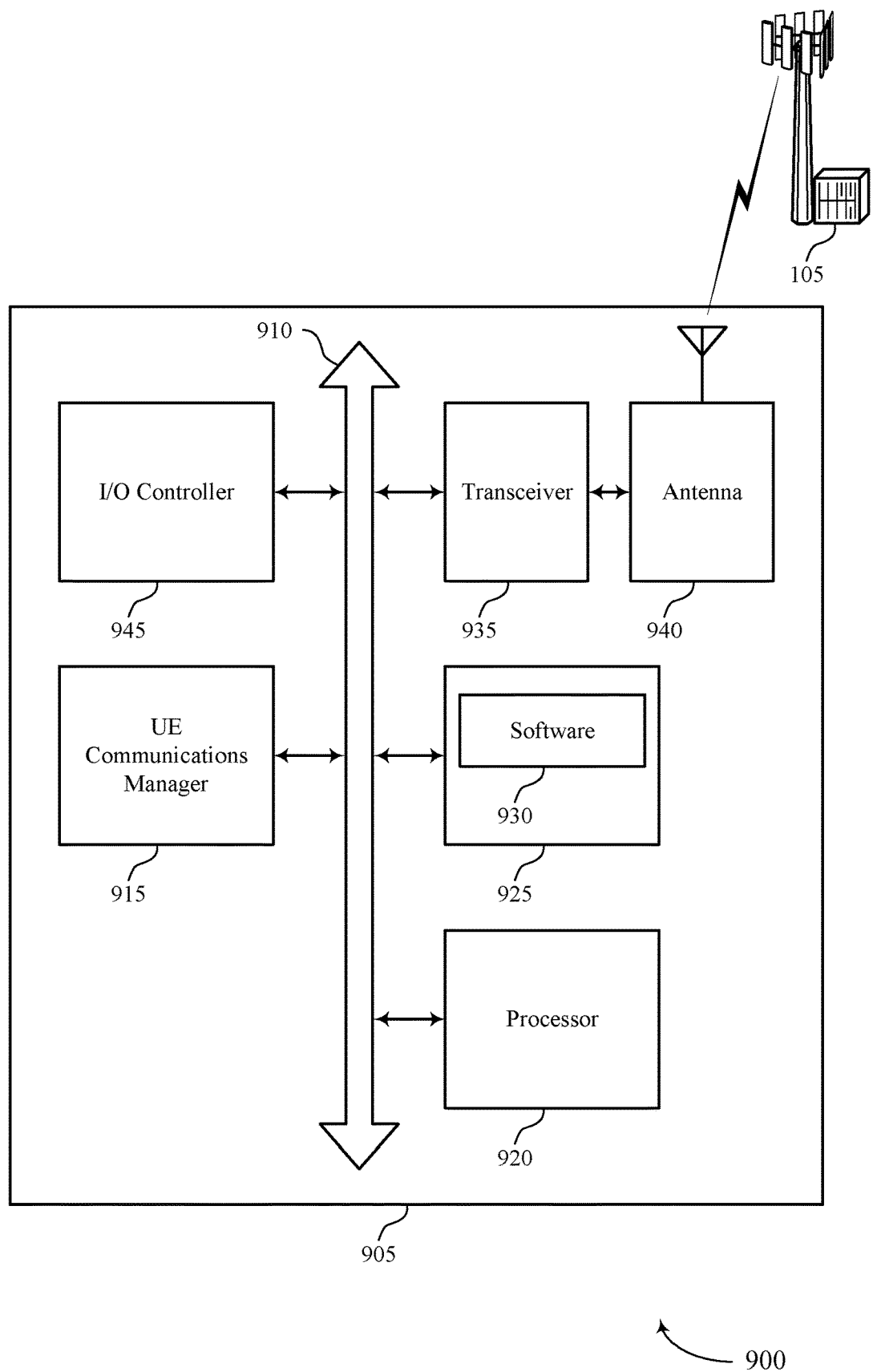
FIG. 9 illustrates a block diagram of a system including a user equipment (UE) that supports dynamic TCI state updating in accordance with aspects of the present disclosure.

FIG. 9 shows a diagram of a system 900 including a device 905 that supports dynamic TCI state updating in accordance with aspects of the present disclosure. Device 905 may be an example of or include the components of wireless device 605, wireless device 705, or a UE 115 as described above, e.g., with reference to FIGS. 6 and 7. Device 905 may include components for bi-directional voice and data communications including components for transmitting and receiving communications, including UE communications manager 915, processor 920, memory 925, software 930, transceiver 935, antenna 940, and I/O controller 945. These components may be in electronic communication via one or more buses (e.g., bus 910). Device 905 may communicate wirelessly with one or more base stations 105.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting dynamic TCI state updating).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Software 930 may include code to implement aspects of the present disclosure, including code to support dynamic TCI state updating. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas. In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
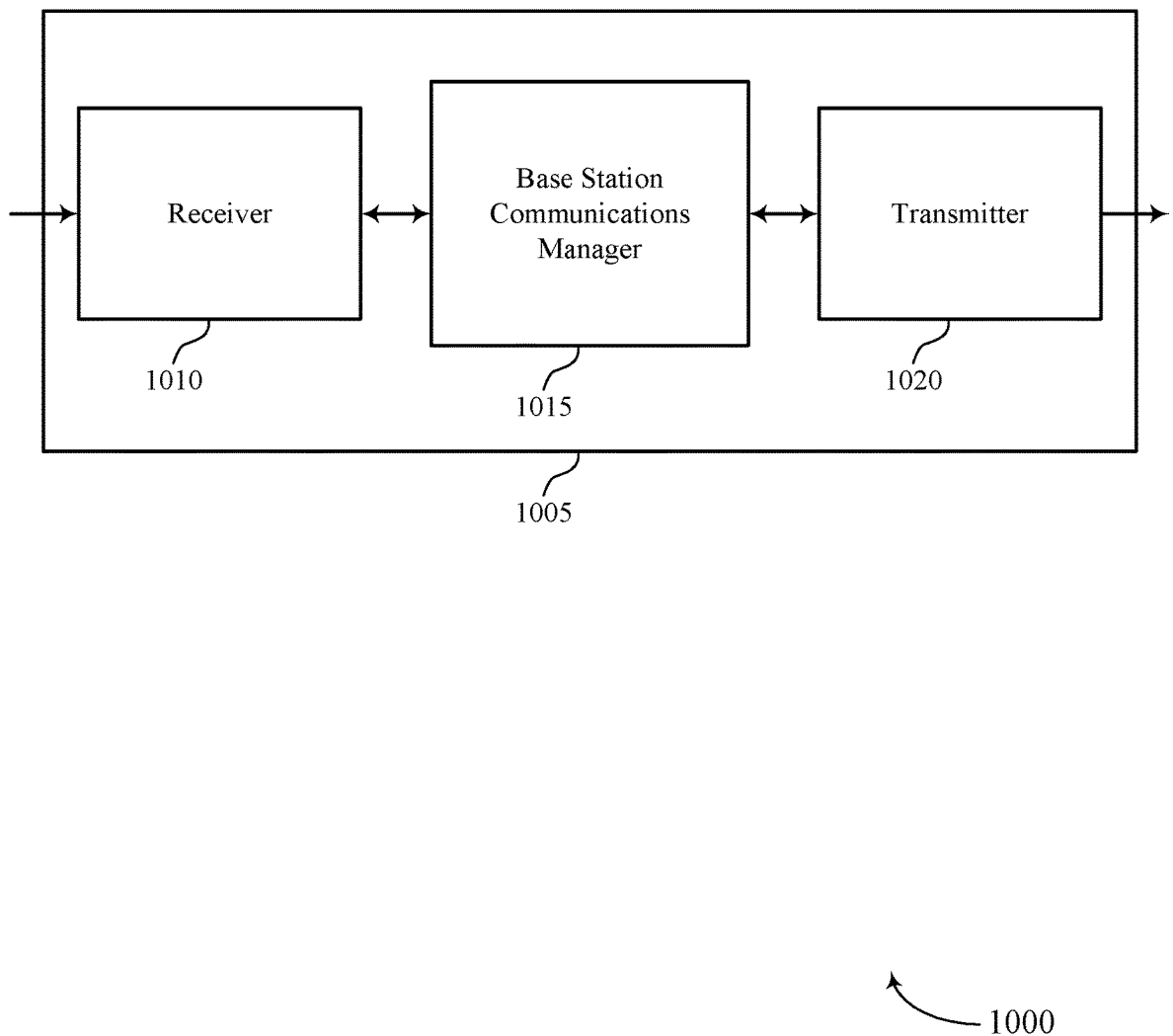
FIG. 10-12 show block diagrams of a device that supports dynamic TCI state updating in accordance with aspects of the present disclosure.

FIG. 10 shows a block diagram 1000 of a wireless device 1005 that supports dynamic TCI state updating in accordance with aspects of the present disclosure. Wireless device 1005 may be an example of aspects of a base station 105 as described herein. Wireless device 1005 may include receiver 1010, base station communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to dynamic TCI state updating, etc.). Information may be passed on to other components of the device. The receiver 1010 may be an example of aspects of the transceiver 1335 described with reference to FIG. 13. The receiver 1010 may utilize a single antenna or a set of antennas.

Base station communications manager 1015 may be an example of aspects of the base station communications manager 1215 described with reference to FIG. 12. Base station communications manager 1015 and/or at least some of its various sub-components may be implemented in hardware, software executed by a processor, firmware, or any combination thereof. If implemented in software executed by a processor, the functions of the base station communications manager 1015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 1015 and/or at least some of its various sub-components may be physically located at various positions, including being distributed such that portions of functions are implemented at different physical locations by one or more physical devices. In some examples, base station communications manager 1015 and/or at least some of its various sub-components may be a separate and distinct component in accordance with various aspects of the present disclosure. In other examples, base station communications manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1015 may identify a set of TCI states that indicate QCL relationships between antenna ports used for communicating with a UE, determine a subset of the set of TCI states to update, the updated subset of the set of TCI states indicating updated QCL relationships between antenna ports used for communicating with the UE, and transmit DCI to the UE that identifies the subset of the set of TCI states to update based on the determining.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may utilize a single antenna or a set of antennas.

Figure 11:
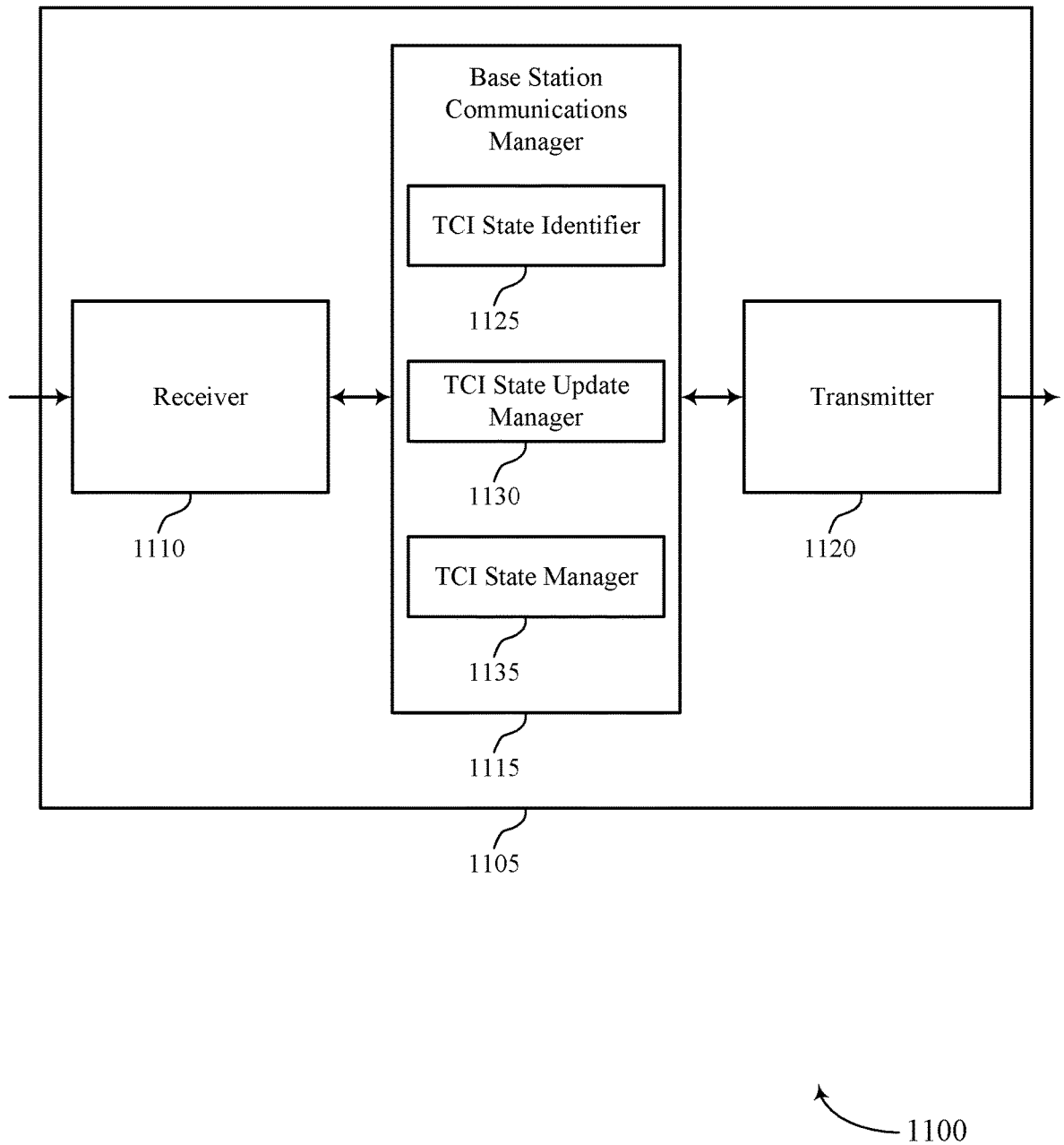

FIG. 11 shows a block diagram 1100 of a wireless device 1105 that supports dynamic TCI state updating in accordance with aspects of the present disclosure. Wireless device 1105 may be an example of aspects of a wireless device 1005 or a base station 105 as described with reference to FIG. 10. Wireless device 1105 may include receiver 1110, base station communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to dynamic TCI state updating, etc.). Information may be passed on to other components of the device. The receiver 1110 may be an example of aspects of the transceiver 1335 described with reference to FIG. 13. The receiver 1110 may utilize a single antenna or a set of antennas.

Base station communications manager 1115 may be an example of aspects of the base station communications manager 1215 described with reference to FIG. 12. Base station communications manager 1115 may include TCI state identifier 1125, TCI state update manager 1130, and TCI state manager 1135.

TCI state identifier 1125 may identify a set of TCI states that indicate QCL relationships between antenna ports used for communicating with a UE. In some cases, TCI state identifier 1125 may transmit, to the UE, an indication of the set of TCI states that indicate QCL relationships between antenna ports used for communicating with the UE. In some cases, the indication is transmitted in RRC signaling or in a MAC-CE. TCI state update manager 1130 may determine a subset of the set of TCI states to update, the updated subset of the set of TCI states indicating updated QCL relationships between antenna ports used for communicating with the UE. TCI state manager 1135 may transmit DCI to the UE that identifies the subset of the set of TCI states to update based on the determining In some cases, TCI state manager 1135 may transmit an indication of a TCI state to the UE in a DCI message in a TTI, the TCI state indicating QCL relationships between antenna ports used for communicating with the UE in the TTI. In some cases, the TCI state is associated with one or more reference signals, and the antenna ports used to transmit the one or more reference signals in the TTI are quasi co-located with antenna ports used to transmit data to the UE in the TTI. In some cases, the TCI state is associated with one or more reference signals, and the antenna ports used to transmit the one or more reference signals are quasi co-located with antenna ports used to transmit control information to the UE in the TTI. In some cases, the one or more reference signals include SSBs, periodic CSI-RSs, aperiodic CSI-RSs, semi-persistent CSI-RSs, or any combination thereof. In some cases, the DCI is transmitted in a PDCCH. In some cases, the DCI is transmitted in a MAC-CE in a PDCCH and a PDSCH.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may utilize a single antenna or a set of antennas.

Figure 12:
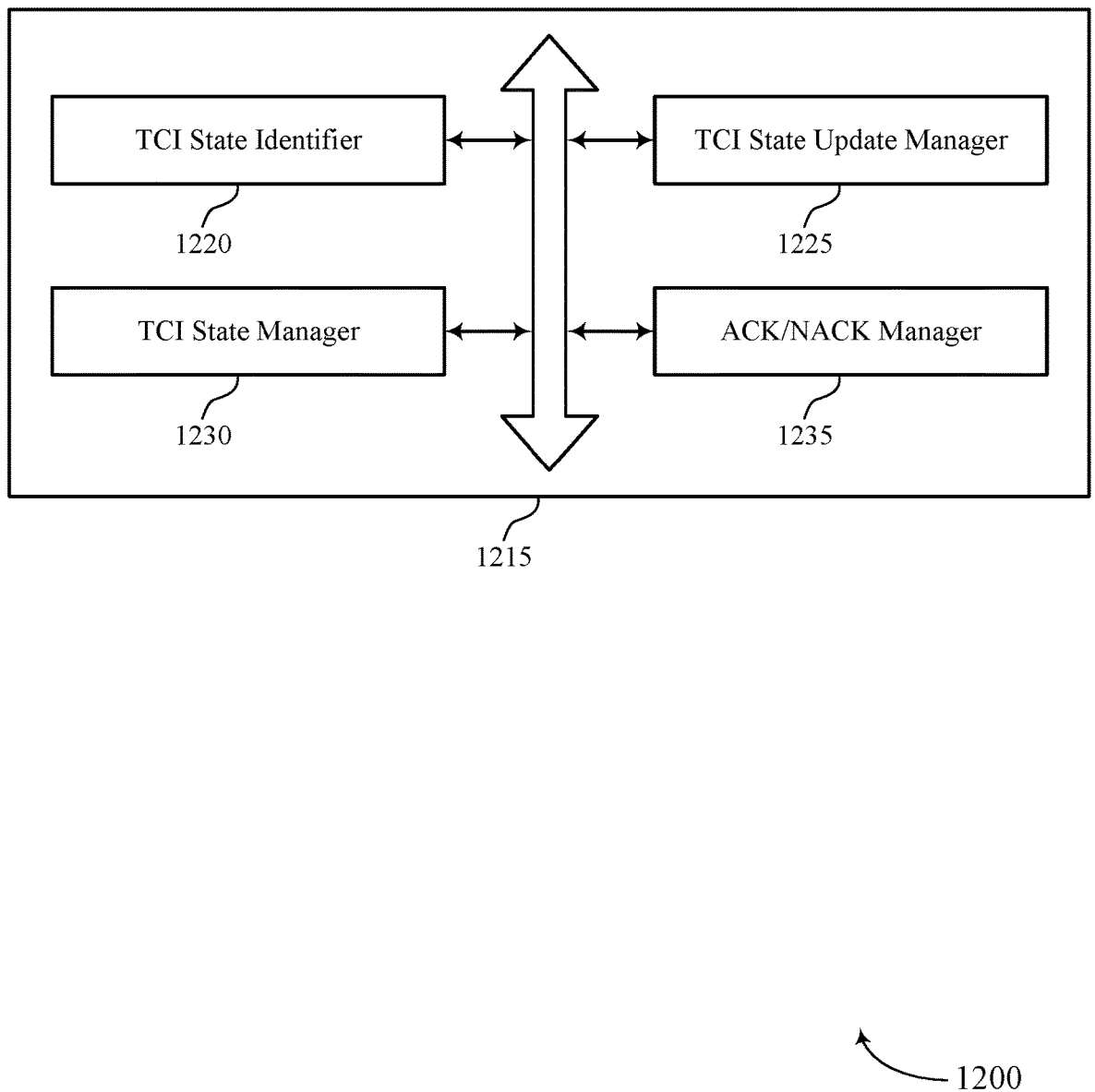

FIG. 12 shows a block diagram 1200 of a base station communications manager 1215 that supports dynamic TCI state updating in accordance with aspects of the present disclosure. The base station communications manager 1215 may be an example of aspects of a base station communications manager 1215 described with reference to FIGS. 10, 11, and 12. The base station communications manager 1215 may include TCI state identifier 1220, TCI state update manager 1225, TCI state manager 1230, and ACK/NACK manager 1235. Each of these modules may communicate, directly or indirectly, with one another (e.g., via one or more buses).

TCI state identifier 1220 may identify a set of TCI states that indicate QCL relationships between antenna ports used for communicating with a UE and transmit, to the UE, an indication of the set of TCI states that indicate QCL relationships between antenna ports used for communicating with the UE. In some cases, the indication is transmitted in RRC signaling or in a MAC-CE. TCI state update manager 1225 may determine a subset of the set of TCI states to update, the updated subset of the set of TCI states indicating updated QCL relationships between antenna ports used for communicating with the UE. TCI state manager 1230 may transmit DCI to the UE that identifies the subset of the set of TCI states to update based on the determining. ACK/NACK manager 1235 may receive, from the UE, an indication as to whether the DCI transmitted to update the subset of the set of TCI states was received. In some cases, the subset of the set of TCI states is updated based on receiving the indication.

In some cases, TCI state manager 1230 may transmit an indication of a TCI state to the UE in a DCI message in a TTI, the TCI state indicating QCL relationships between antenna ports used for communicating with the UE in the TTI. In some cases, the TCI state is associated with one or more reference signals, and the antenna ports used to transmit the one or more reference signals in the TTI are quasi co-located with antenna ports used to transmit data to the UE in the TTI. In some cases, the TCI state is associated with one or more reference signals, and the antenna ports used to transmit the one or more reference signals are quasi co-located with antenna ports used to transmit control information to the UE in the TTI. In some cases, the one or more reference signals include SSBs, periodic CSI-RSs, aperiodic CSI-RSs, semi-persistent CSI-RSs, or any combination thereof. In some cases, the DCI is transmitted in a PDCCH. In some cases, the DCI is transmitted in a MAC-CE in a PDCCH and a PDSCH.

Figure 13:
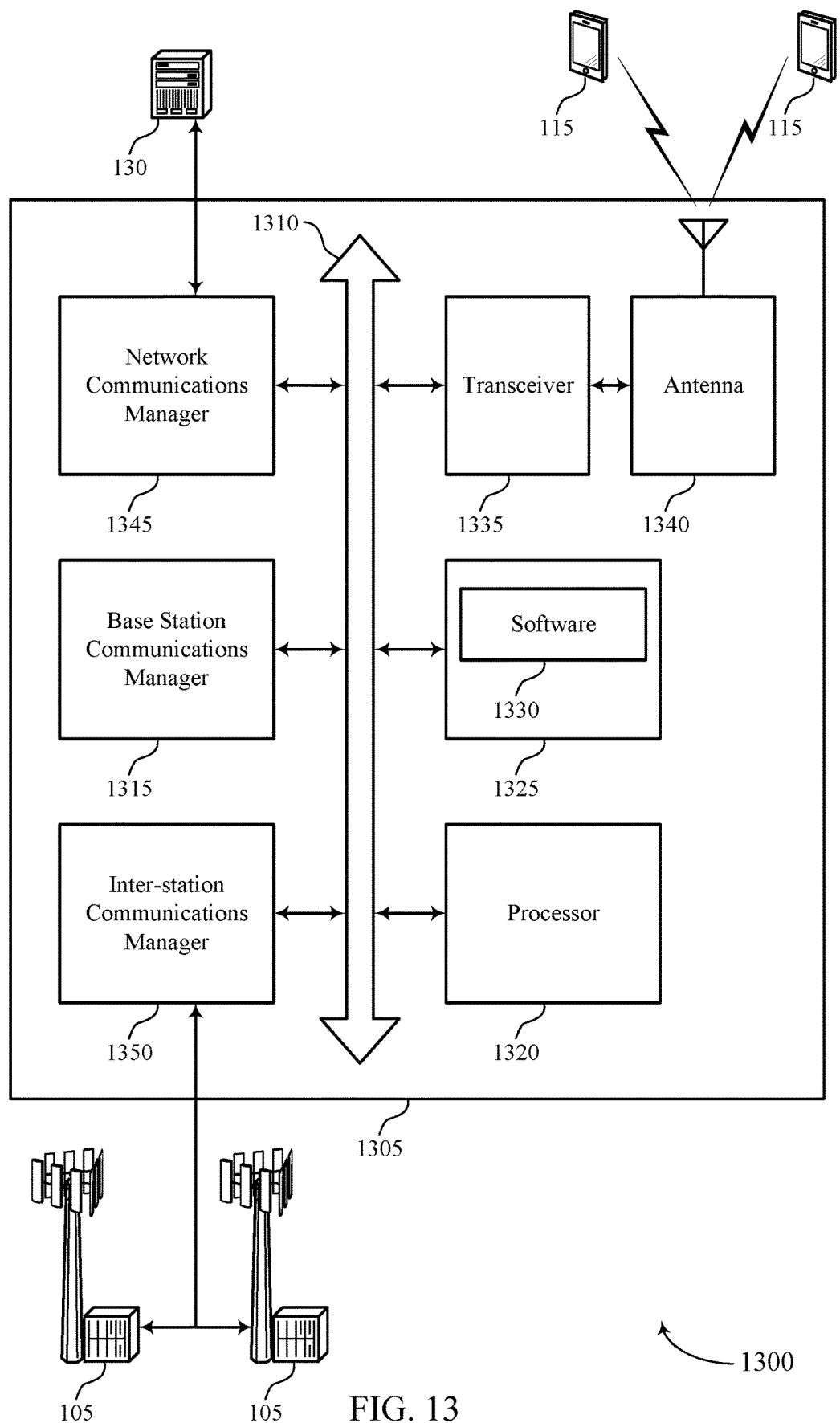
FIG. 13 illustrates a block diagram of a system including a base station that supports dynamic TCI state updating in accordance with aspects of the present disclosure.

FIG. 13 shows a diagram of a system 1300 including a device 1305 that supports dynamic TCI state updating in accordance with aspects of the present disclosure. Device 1305 may be an example of or include the components of base station 105 as described above, e.g., with reference to FIG. 1. Device 1305 may include components for bi-directional voice and data communications including components for transmitting and receiving communications, including base station communications manager 1315, processor 1320, memory 1325, software 1330, transceiver 1335, antenna 1340, network communications manager 1345, and inter-station communications manager 1350. These components may be in electronic communication via one or more buses (e.g., bus 1310). Device 1305 may communicate wirelessly with one or more UEs 115.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting dynamic TCI state updating).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware or software operation such as the interaction with peripheral components or devices.

Software 1330 may include code to implement aspects of the present disclosure, including code to support dynamic TCI state updating. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

Network communications manager 1345 may manage communications with the core network (e.g., via one or more wired backhaul links). For example, the network communications manager 1345 may manage the transfer of data communications for client devices, such as one or more UEs 115.

Inter-station communications manager 1350 may manage communications with other base station 105, and may include a controller or scheduler for controlling communications with UEs 115 in cooperation with other base stations 105. For example, the inter-station communications manager 1350 may coordinate scheduling for transmissions to UEs 115 for various interference mitigation techniques such as beamforming or joint transmission. In some examples, inter-station communications manager 1350 may provide an X2 interface within an LTE or LTE-A wireless communication network technology to provide communication between base stations 105.

Figure 14:
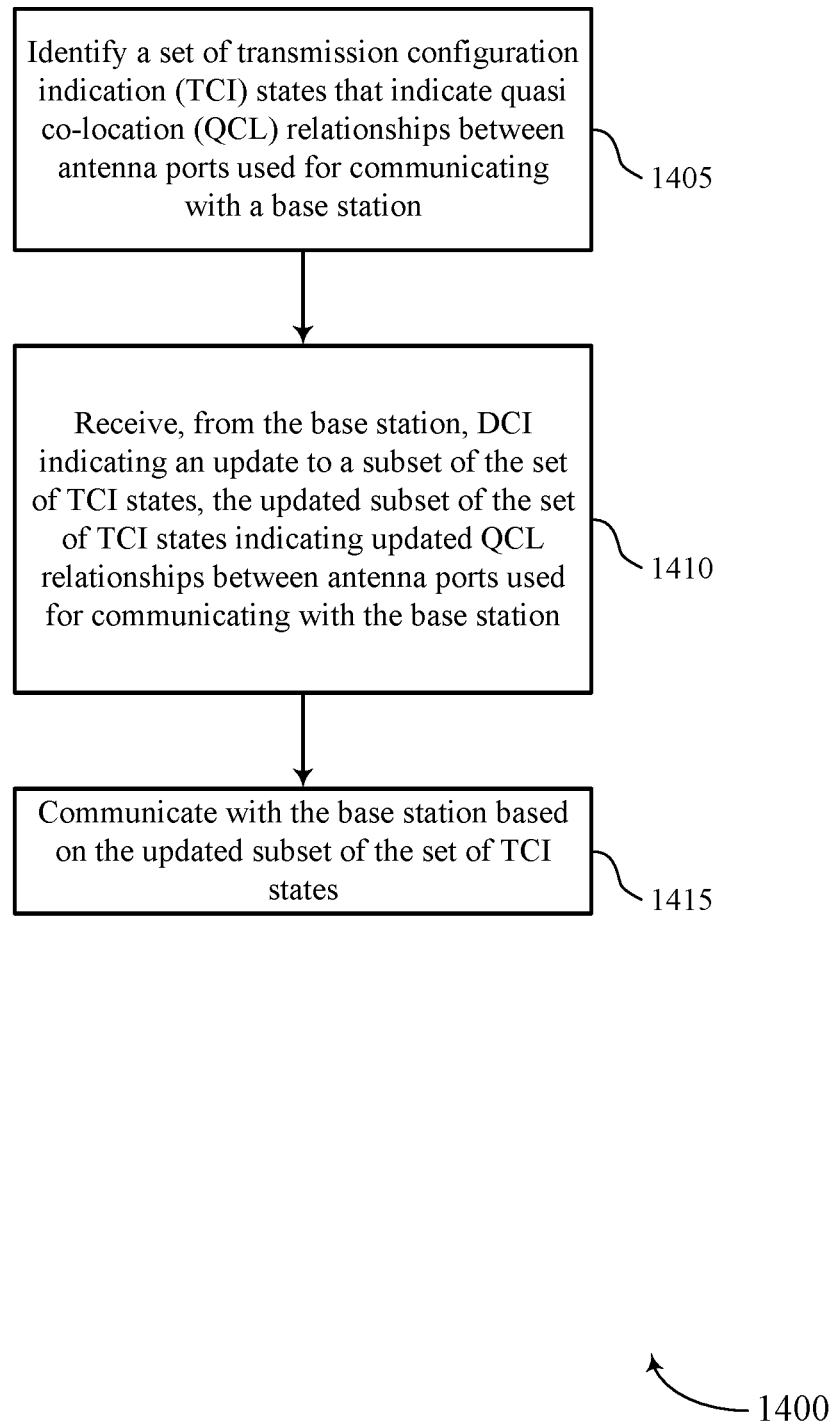
FIGS. 14 and 15 show flowcharts illustrating methods for dynamic TCI state updating in accordance with aspects of the present disclosure.

FIG. 14 shows a flowchart illustrating a method 1400 for dynamic TCI state updating in accordance with aspects of the present disclosure. The operations of method 1400 may be implemented by a UE 115 or its components as described herein. For example, the operations of method 1400 may be performed by a UE communications manager as described with reference to FIGS. 6 through 9. In some examples, a UE 115 may execute a set of codes to control the functional elements of the device to perform the functions described below. Additionally, or alternatively, the UE 115 may perform aspects of the functions described below using special-purpose hardware.

At 1405 the UE 115 may identify a set of TCI states that indicate QCL relationships between antenna ports used for communicating with a base station. The operations of 1405 may be performed according to the methods described herein. In certain examples, aspects of the operations of 1405 may be performed by a TCI state identifier as described with reference to FIGS. 6 through 9.

At 1410 the UE 115 may receive, from the base station, DCI indicating an update to a subset of the set of TCI states, the updated subset of the set of TCI states indicating updated QCL relationships between antenna ports used for communicating with the base station. The operations of 1410 may be performed according to the methods described herein. In certain examples, aspects of the operations of 1410 may be performed by a TCI state update manager as described with reference to FIGS. 6 through 9.

At 1415 the UE 115 may communicate with the base station based on the updated subset of the set of TCI states. The operations of 1415 may be performed according to the methods described herein. In certain examples, aspects of the operations of 1415 may be performed by a TCI state manager as described with reference to FIGS. 6 through 9.

Figure 15:
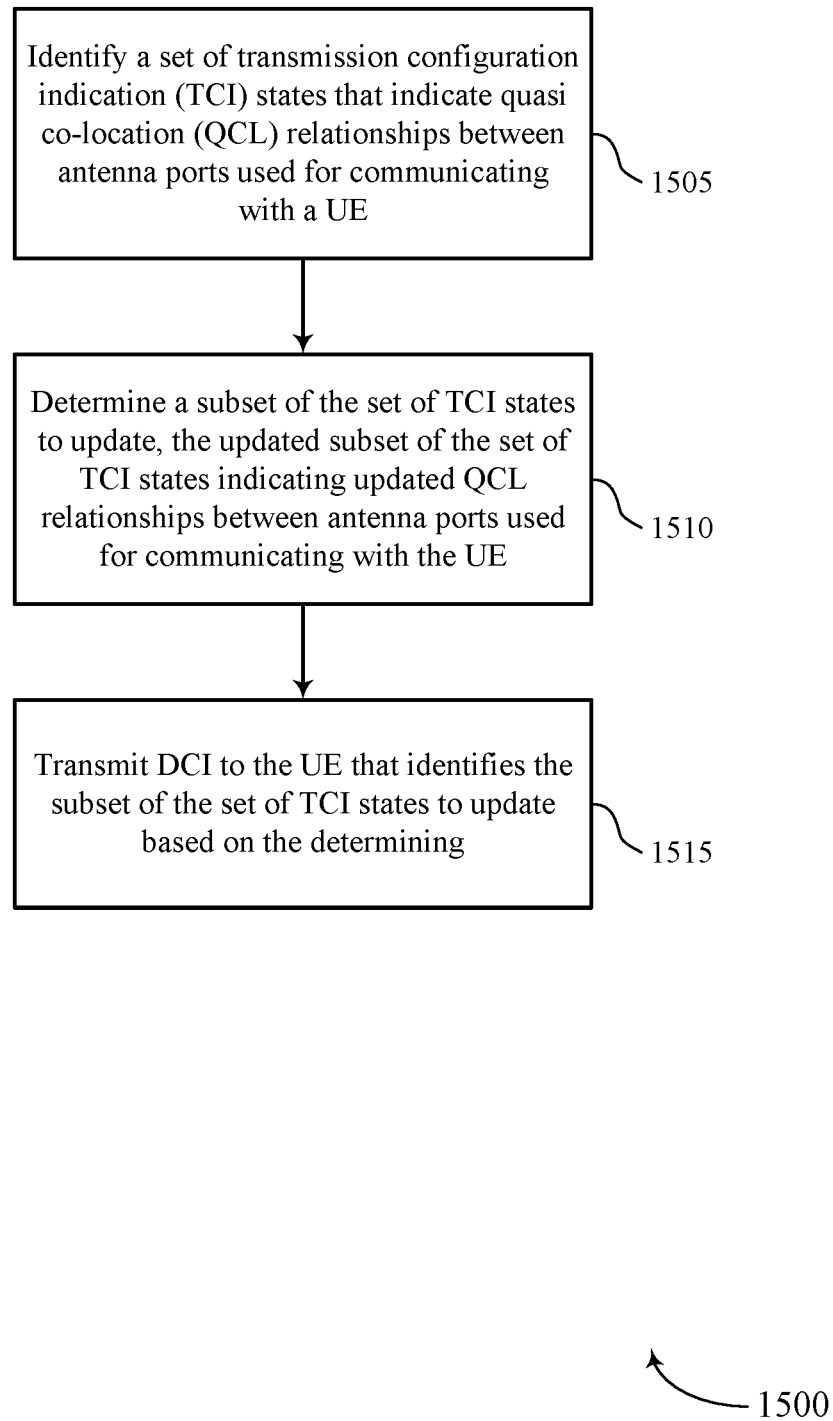

FIG. 15 shows a flowchart illustrating a method 1500 for dynamic TCI state updating in accordance with aspects of the present disclosure. The operations of method 1500 may be implemented by a base station 105 or its components as described herein. For example, the operations of method 1500 may be performed by a base station communications manager as described with reference to FIGS. 10 through 13. In some examples, a base station 105 may execute a set of codes to control the functional elements of the device to perform the functions described below. Additionally, or alternatively, the base station 105 may perform aspects of the functions described below using special-purpose hardware.

At 1505 the base station 105 may identify a set of TCI states that indicate QCL relationships between antenna ports used for communicating with a UE. The operations of 1505 may be performed according to the methods described herein. In certain examples, aspects of the operations of 1505 may be performed by a TCI state identifier as described with reference to FIGS. 10 through 13.

At 1510 the base station 105 may determine a subset of the set of TCI states to update, the updated subset of the set of TCI states indicating updated QCL relationships between antenna ports used for communicating with the UE. The operations of 1510 may be performed according to the methods described herein. In certain examples, aspects of the operations of 1510 may be performed by a TCI state update manager as described with reference to FIGS. 10 through 13.

At 1515 the base station 105 may transmit DCI to the UE that identifies the subset of the set of TCI states to update based on the determining. The operations of 1515 may be performed according to the methods described herein. In certain examples, aspects of the operations of 1515 may be performed by a TCI state manager as described with reference to FIGS. 10 through 13.

Figure 16:
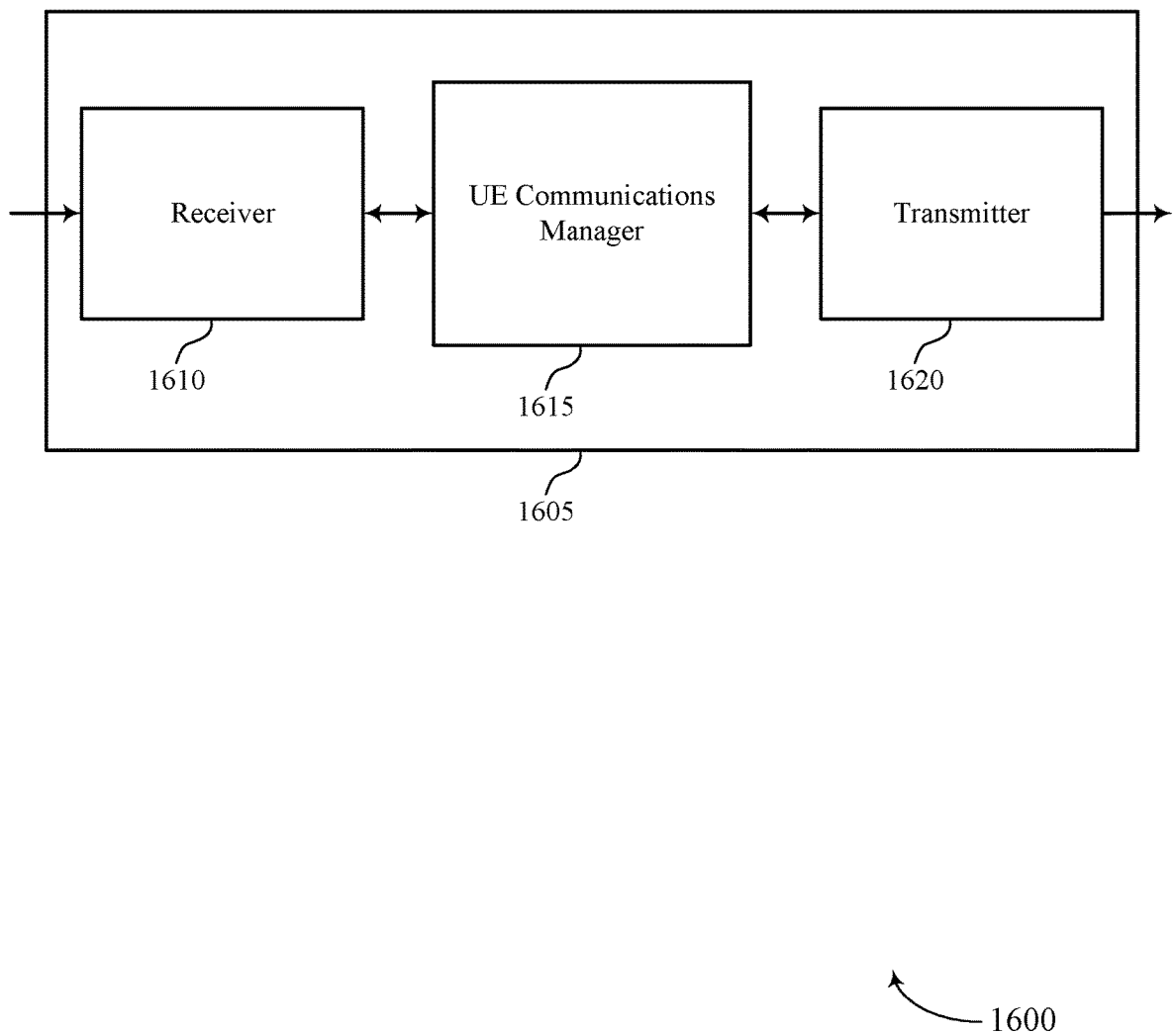
FIGS. 16 through 18 show block diagrams of a device that supports TCI based beam switching in accordance with aspects of the present disclosure.

FIG. 16 shows a block diagram 1600 of a wireless device 1605 that supports TCI based beam switching in accordance with aspects of the present disclosure. Wireless device 1605 may be an example of aspects of a UE 115 as described herein. Wireless device 1605 may include receiver 1610, UE communications manager 1615, and transmitter 1620. Wireless device 1605 may also include a processor. Each of these components may be in communication with one another (e.g., via one or more buses).

Receiver 1610 may receive information such as packets, user data, or control information associated with various information channels (e.g., control channels, data channels, and information related to TCI based beam switching, etc.). Information may be passed on to other components of the device. The receiver 1610 may be an example of aspects of the transceiver 1935 described with reference to FIG. 19. The receiver 1610 may utilize a single antenna or a set of antennas.

Receiver 1610 may receive a downlink control channel and a downlink data channel based on the triggered beam switching operation.

UE communications manager 1615 may be an example of aspects of the UE communications manager 1915 described with reference to FIG. 19. UE communications manager 1615 and/or at least some of its various sub-components may be implemented in hardware, software executed by a processor, firmware, or any combination thereof. If implemented in software executed by a processor, the functions of the UE communications manager 1615 and/or at least some of its various sub-components may be executed by a general-purpose processor, a DSP, an ASIC, an FPGA, or other programmable logic device, discrete gate or transistor logic, discrete hardware components, or any combination thereof designed to perform the functions described in the present disclosure. The UE communications manager 1615 and/or at least some of its various sub-components may be physically located at various positions, including being distributed such that portions of functions are implemented at different physical locations by one or more physical devices. In some examples, UE communications manager 1615 and/or at least some of its various sub-components may be a separate and distinct component in accordance with various aspects of the present disclosure. In other examples, UE communications manager 1615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 1615 may receive, from a base station, a first indication that DCI-based control beam switching is enabled. UE communications manager 1615 may receive, from the base station, DCI indicating a TCI state, where the indicated TCI state is associated with a data beam switch (e.g., a first subset of TCI states) or both a control beam switch and a data beam switch (e.g., a second subset of TCI states). UE communications manager 1615 may trigger, based on the first indication and the TCI state (e.g., whether the indicated TCI state belongs to the first subset of TCI states or the second subset of TCI states), a first beam switching operation or a second beam switching operation, where the first beam switching operation includes data beam switching and the second beam switching operation includes data beam switching and control beam switching.

Transmitter 1620 may transmit signals generated by other components of the device. In some examples, the transmitter 1620 may be collocated with a receiver 1610 in a transceiver module. For example, the transmitter 1620 may be an example of aspects of the transceiver 1935 described with reference to FIG. 19. The transmitter 1620 may utilize a single antenna or a set of antennas.

Figure 17:
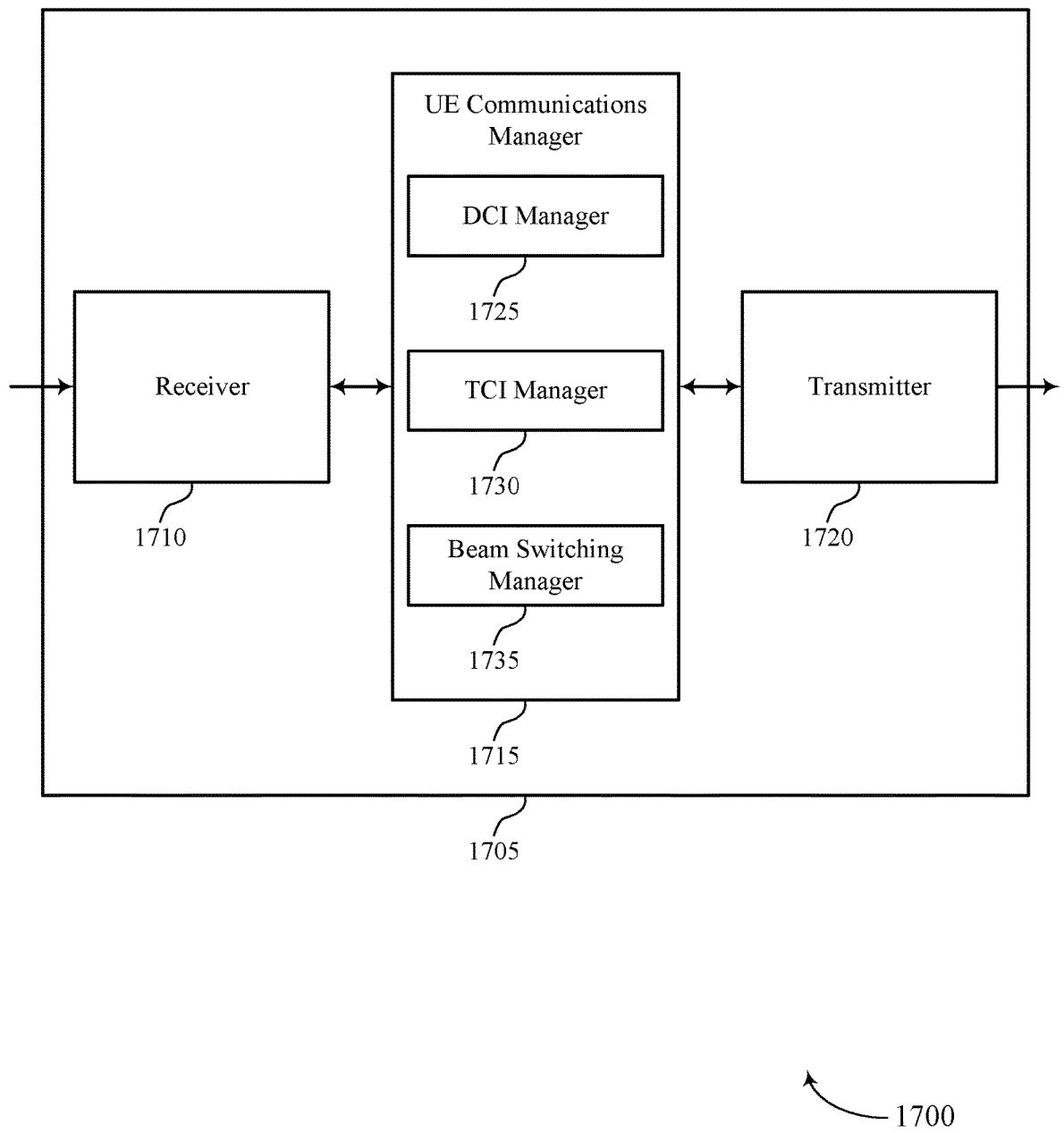

FIG. 17 shows a block diagram 1700 of a wireless device 1705 that supports TCI based beam switching in accordance with aspects of the present disclosure. Wireless device 1705 may be an example of aspects of a wireless device 1605 or a UE 115 as described with reference to FIG. 16. Wireless device 1705 may include receiver 1710, UE communications manager 1715, and transmitter 1720. Wireless device 1705 may also include a processor. Each of these components may be in communication with one another (e.g., via one or more buses).

Receiver 1710 may receive information such as packets, user data, or control information associated with various information channels (e.g., control channels, data channels, and information related to TCI based beam switching, etc.). Information may be passed on to other components of the device. The receiver 1710 may be an example of aspects of the transceiver 1935 described with reference to FIG. 19. The receiver 1710 may utilize a single antenna or a set of antennas.

UE communications manager 1715 may be an example of aspects of the UE communications manager 1915 described with reference to FIG. 19. UE communications manager 1715 may also include DCI manager 1725, TCI manager 1730, and beam switching manager 1735.

DCI manager 1725 may receive, from a base station, a first indication that DCI-based control beam switching is enabled and receive, from the base station, a second indication that TCI state information in DCI is enabled.

TCI manager 1730 may receive, from the base station, DCI including a TCI state, where the indicated TCI state is associated with one of a first subset of TCI states or a second subset of TCI states.

Beam switching manager 1735 may trigger, based on the first indication and whether the indicated TCI state belongs to the first subset of TCI states or the second subset of TCI states, a first beam switching operation or a second beam switching operation, where the first beam switching operation includes data beam switching and the second beam switching operation includes data beam switching and control beam switching. Beam switching manager 1735 may trigger the first beam switching operation or the second beam switching operation is further based on the second indication. Beam switching manager 1735 may refrain from performing the second beam switching operation for a period of time defined by a threshold control offset parameter. In some cases, the control beam switching of the second beam switching operation includes identifying a QCL relationship between reference signals of the downlink control channel and a reference signal set corresponding to the indicated TCI state. In some cases, the control beam switching of the second beam switching operation includes identifying a QCL relationship between an aperiodic CSI-RS and a reference signal set corresponding to the indicated TCI state. In some cases, at least one of the first indication or the second indication is received in RRC signaling or in a MAC-CE.

Transmitter 1720 may transmit signals generated by other components of the device. In some examples, the transmitter 1720 may be collocated with a receiver 1710 in a transceiver module. For example, the transmitter 1720 may be an example of aspects of the transceiver 1935 described with reference to FIG. 19. The transmitter 1720 may utilize a single antenna or a set of antennas.

Figure 18:
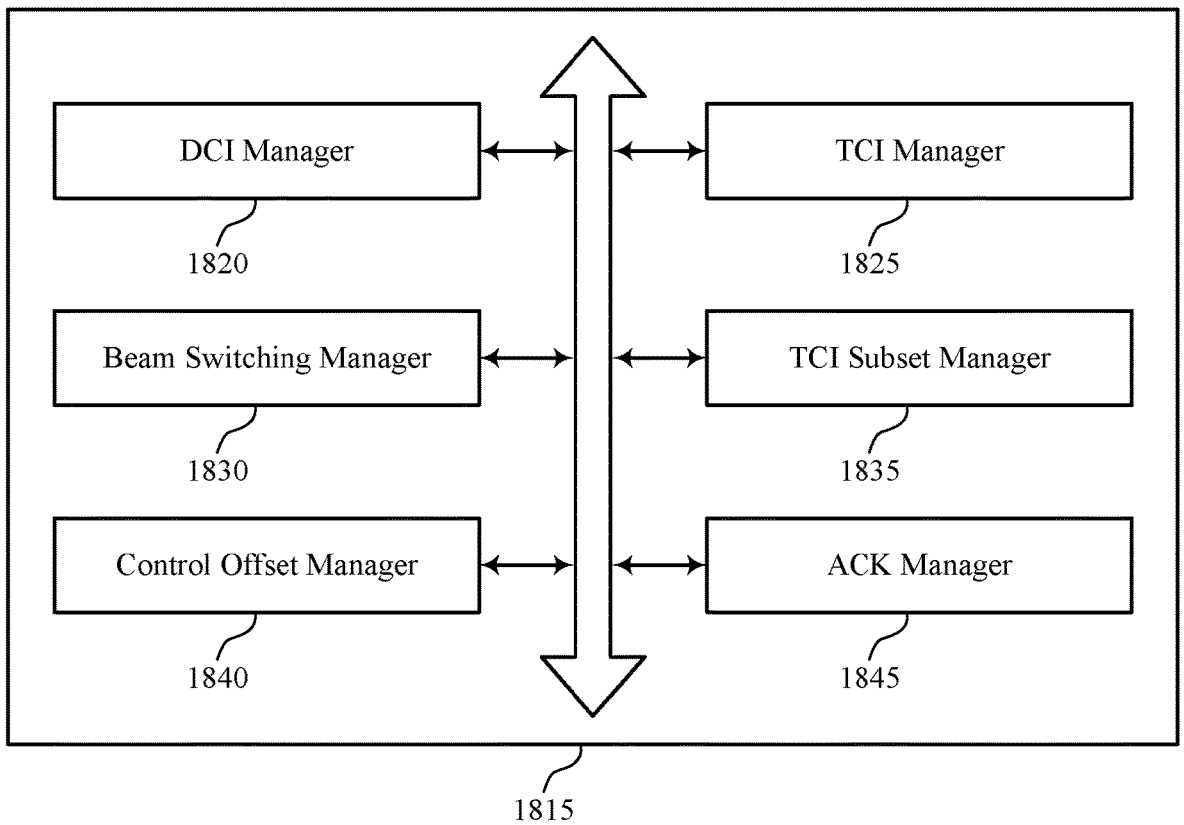

FIG. 18 shows a block diagram 1800 of a UE communications manager 1815 that supports TCI based beam switching in accordance with aspects of the present disclosure. The UE communications manager 1815 may be an example of aspects of a UE communications manager 1615, a UE communications manager 1715, or a UE communications manager 1915 described with reference to FIGS. 16, 17, and 19. The UE communications manager 1815 may include DCI manager 1820, TCI manager 1825, beam switching manager 1830, TCI subset manager 1835, control offset manager 1840, and ACK manager 1845. Each of these modules may communicate, directly or indirectly, with one another (e.g., via one or more buses).

DCI manager 1820 may receive a first indication that DCI-based control beam switching is enabled and receive a second indication that TCI state information in DCI is enabled.

TCI manager 1825 may receive DCI including a TCI state, where the indicated TCI state is associated with one of a first subset of TCI states or a second subset of TCI states.

Beam switching manager 1830 may trigger, based on the first indication and whether the indicated TCI state belongs to the first subset of TCI states or the second subset of TCI states, a first beam switching operation or a second beam switching operation, where the first beam switching operation includes data beam switching and the second beam switching operation includes data beam switching and control beam switching. Beam switching manager 1830 may trigger the first beam switching operation or the second beam switching operation is further based on the second indication, and refrain from performing the second beam switching operation for a period of time defined by a threshold control offset parameter. In some cases, the control beam switching of the second beam switching operation includes identifying a QCL relationship between reference signals of the downlink control channel and a reference signal set corresponding to the indicated TCI state. In some cases, at least one of the first indication or the second indication is received in RRC signaling or in a MAC-CE.

TCI subset manager 1835 may determine whether the indicated TCI state belongs to the first subset of TCI states or the second subset of TCI states based on an MSB of the indicated TCI state (e.g., where the first subset of TCI states are associated with the data beam switch and the second subset of TCI states are associated with both the control beam switch and the data beam switch).

Control offset manager 1840 may receive the threshold control offset parameter from the base station.

ACK manager 1845 may transmit an ACK or a NACK message for the received DCI, where a beginning of the period of time is defined by a transmission time of the ACK or NACK message for the received DCI.

Figure 19:
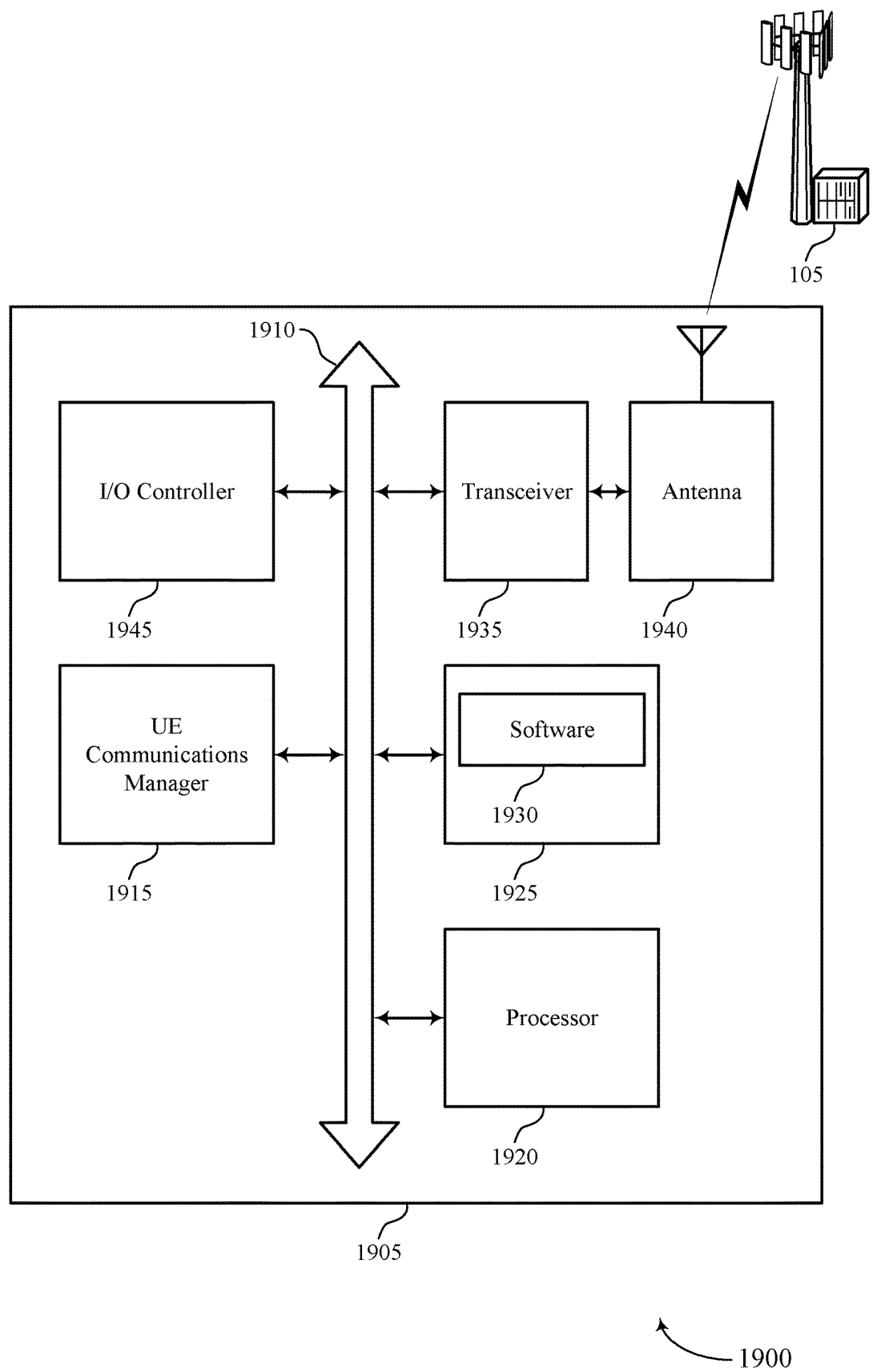
FIG. 19 illustrates a block diagram of a system including a UE that supports TCI based beam switching in accordance with aspects of the present disclosure.

FIG. 19 shows a diagram of a system 1900 including a device 1905 that supports TCI based beam switching in accordance with aspects of the present disclosure. Device 1905 may be an example of or include the components of wireless device 1605, wireless device 1705, or a UE 115 as described above, e.g., with reference to FIGS. 16 and 17. Device 1905 may include components for bi-directional voice and data communications including components for transmitting and receiving communications, including UE communications manager 1915, processor 1920, memory 1925, software 1930, transceiver 1935, antenna 1940, and I/O controller 1945. These components may be in electronic communication via one or more buses (e.g., bus 1910). Device 1905 may communicate wirelessly with one or more base stations 105.

Processor 1920 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1920 may be configured to operate a memory array using a memory controller. In other cases, a memory controller may be integrated into processor 1920. Processor 1920 may be configured to execute computer-readable instructions stored in a memory to perform various functions (e.g., functions or tasks supporting TCI based beam switching).

Memory 1925 may include RAM and ROM. The memory 1925 may store computer-readable, computer-executable software 1930 including instructions that, when executed, cause the processor to perform various functions described herein. In some cases, the memory 1925 may contain, among other things, a BIOS which may control basic hardware or software operation such as the interaction with peripheral components or devices.

Software 1930 may include code to implement aspects of the present disclosure, including code to support TCI based beam switching. Software 1930 may be stored in a non-transitory computer-readable medium such as system memory or other memory. In some cases, the software 1930 may not be directly executable by the processor but may cause a computer (e.g., when compiled and executed) to perform functions described herein.

Transceiver 1935 may communicate bi-directionally, via one or more antennas, wired, or wireless links as described above. For example, the transceiver 1935 may represent a wireless transceiver and may communicate bi-directionally with another wireless transceiver. The transceiver 1935 may also include a modem to modulate the packets and provide the modulated packets to the antennas for transmission, and to demodulate packets received from the antennas.

In some cases, the wireless device may include a single antenna 1940. However, in some cases the device may have more than one antenna 1940, which may be capable of concurrently transmitting or receiving multiple wireless transmissions.

I/O controller 1945 may manage input and output signals for device 1905. I/O controller 1945 may also manage peripherals not integrated into device 1905. In some cases, I/O controller 1945 may represent a physical connection or port to an external peripheral. In some cases, I/O controller 1945 may utilize an operating system such as iOS®, ANDROID®, MS-DOS®, MS-WINDOWS®, OS/2®, UNIX®, LINUX®, or another known operating system. In other cases, I/O controller 1945 may represent or interact with a modem, a keyboard, a mouse, a touchscreen, or a similar device. In some cases, I/O controller 1945 may be implemented as part of a processor. In some cases, a user may interact with device 1905 via I/O controller 1945 or via hardware components controlled by I/O controller 1945.

Figure 20:
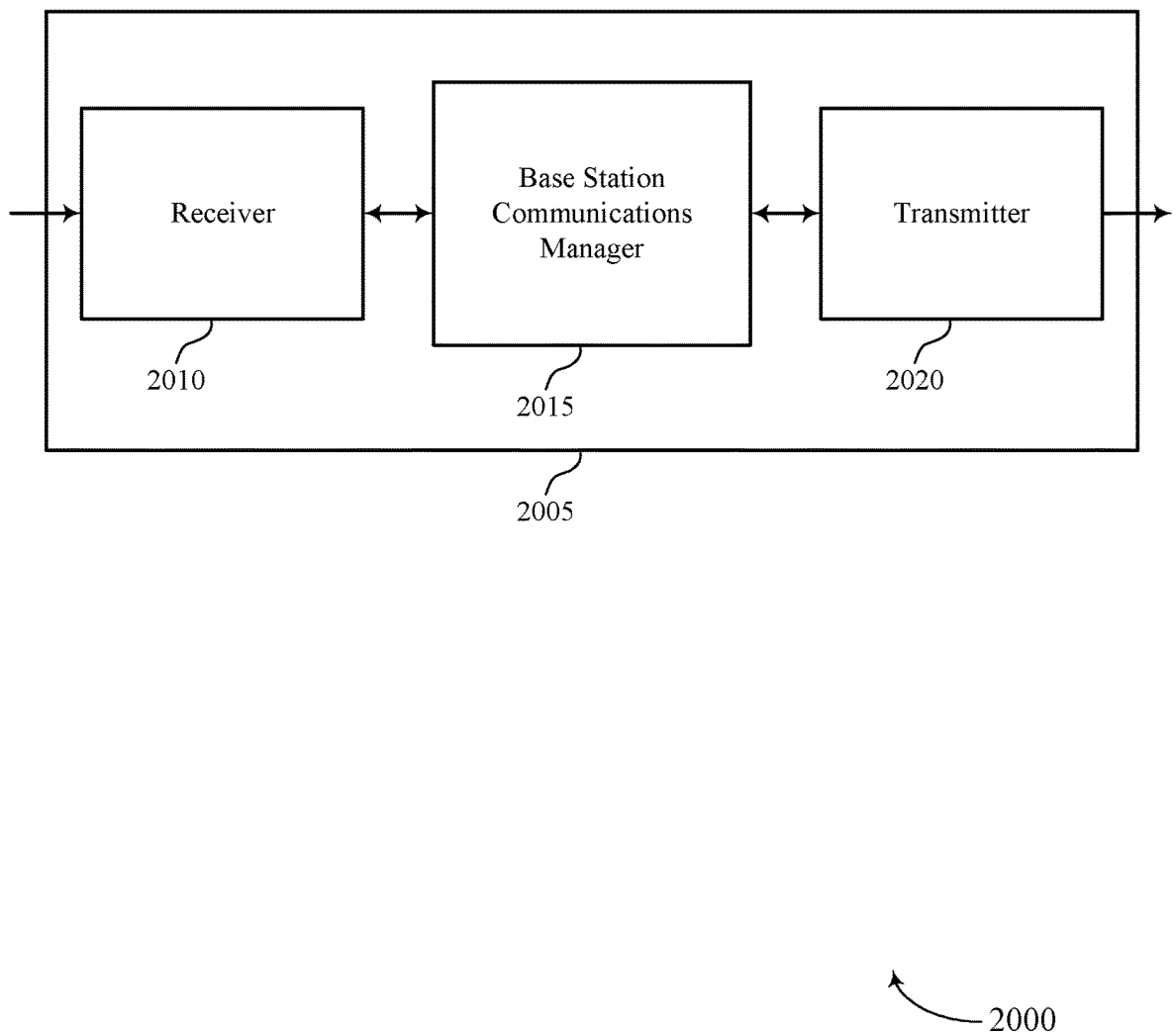
FIGS. 20 through 22 show block diagrams of a device that supports TCI based beam switching in accordance with aspects of the present disclosure.

FIG. 20 shows a block diagram 2000 of a wireless device 2005 that supports TCI based beam switching in accordance with aspects of the present disclosure. Wireless device 2005 may be an example of aspects of a base station 105 as described herein. Wireless device 2005 may include receiver 2010, base station communications manager 2015, and transmitter 2020. Wireless device 2005 may also include a processor. Each of these components may be in communication with one another (e.g., via one or more buses).

Receiver 2010 may receive information such as packets, user data, or control information associated with various information channels (e.g., control channels, data channels, and information related to TCI based beam switching, etc.). Information may be passed on to other components of the device. The receiver 2010 may be an example of aspects of the transceiver 2335 described with reference to FIG. 23. The receiver 2010 may utilize a single antenna or a set of antennas.

Base station communications manager 2015 may be an example of aspects of the base station communications manager 2315 described with reference to FIG. 23.

Base station communications manager 2015 and/or at least some of its various sub-components may be implemented in hardware, software executed by a processor, firmware, or any combination thereof If implemented in software executed by a processor, the functions of the base station communications manager 2015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 2015 and/or at least some of its various sub-components may be physically located at various positions, including being distributed such that portions of functions are implemented at different physical locations by one or more physical devices. In some examples, base station communications manager 2015 and/or at least some of its various sub-components may be a separate and distinct component in accordance with various aspects of the present disclosure. In other examples, base station communications manager 2015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 2015 may transmit to a UE a first indication that DCI-based control beam switching is enabled. Base station communications manager 2015 may transmit to the UE DCI including a TCI state, where the indicated TCI state is associated with a data beam switch (e.g., a first subset of TCI states) or both a control beam switch and a data beam switch (e.g., a second subset of TCI states). Base station communications manager 2015 may trigger, based on the first indication and the TCI state (e.g., whether the indicated TCI state belongs to the first subset of TCI states or the second subset of TCI states), a first beam switching operation or a second beam switching operation, where the first beam switching operation includes data beam switching and the second beam switching operation includes data beam switching and control beam switching.

Transmitter 2020 may transmit signals generated by other components of the device. In some examples, the transmitter 2020 may be collocated with a receiver 2010 in a transceiver module. For example, the transmitter 2020 may be an example of aspects of the transceiver 2335 described with reference to FIG. 23. The transmitter 2020 may utilize a single antenna or a set of antennas. Transmitter 2020 may transmit a downlink control channel and a downlink data channel based on the triggered beam switching operation.

Figure 21:
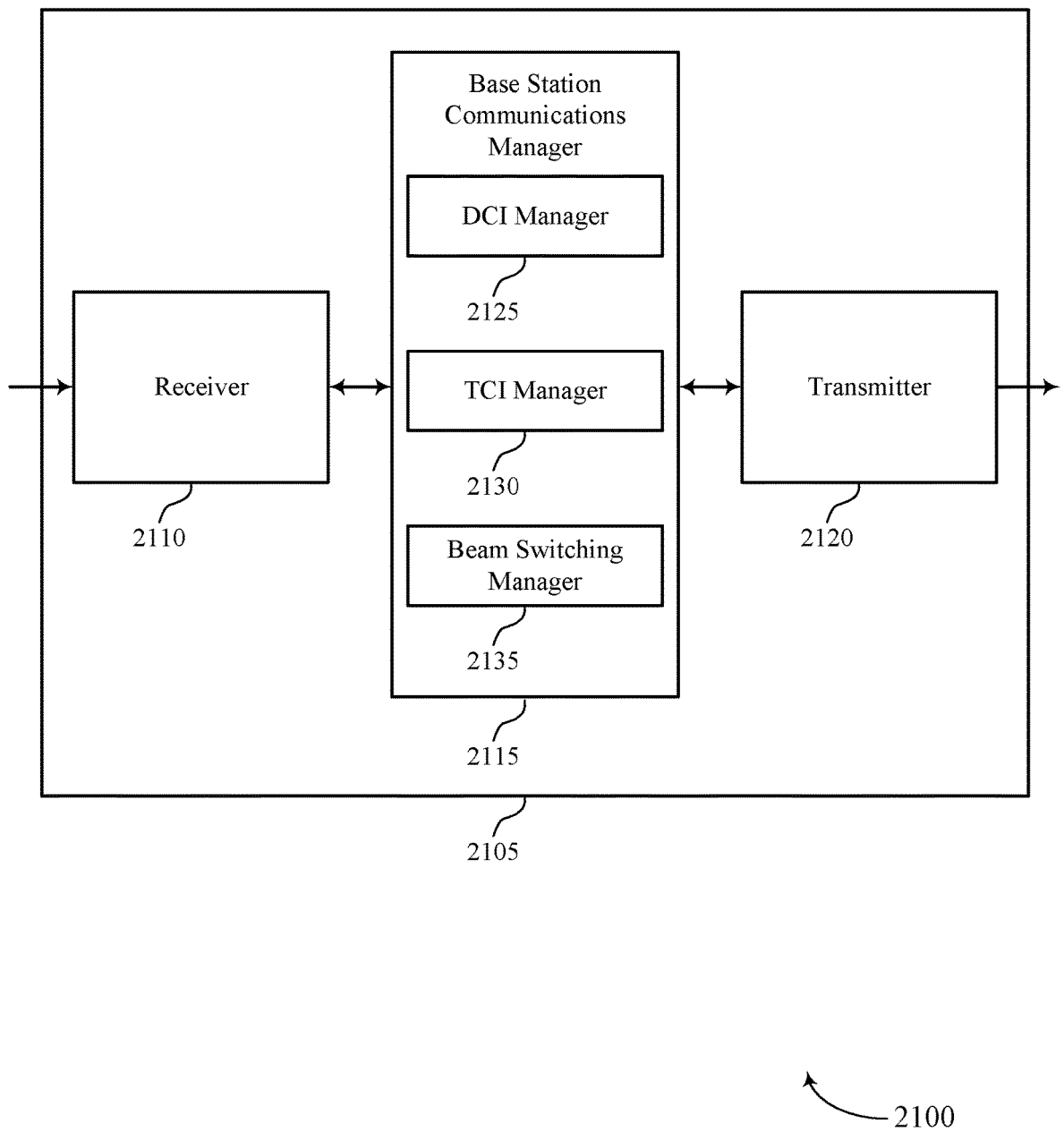

FIG. 21 shows a block diagram 2100 of a wireless device 2105 that supports TCI based beam switching in accordance with aspects of the present disclosure. Wireless device 2105 may be an example of aspects of a wireless device 2005 or a base station 105 as described with reference to FIG. 20. Wireless device 2105 may include receiver 2110, base station communications manager 2115, and transmitter 2120. Wireless device 2105 may also include a processor. Each of these components may be in communication with one another (e.g., via one or more buses).

Receiver 2110 may receive information such as packets, user data, or control information associated with various information channels (e.g., control channels, data channels, and information related to TCI based beam switching, etc.). Information may be passed on to other components of the device. The receiver 2110 may be an example of aspects of the transceiver 2335 described with reference to FIG. 23. The receiver 2110 may utilize a single antenna or a set of antennas.

Base station communications manager 2115 may be an example of aspects of the base station communications manager 2315 described with reference to FIG. 23. Base station communications manager 2115 may also include DCI manager 2125, TCI manager 2130, and beam switching manager 2135.

DCI manager 2125 may transmit to a UE a first indication that DCI-based control beam switching is enabled and transmit to the UE a second indication that TCI state information in DCI is enabled, where triggering the first beam switching operation or the second beam switching operation is further based on the second indication. In some cases, at least one of the first indication or the second indication is transmitted using RRC signaling or a MAC-CE.

TCI manager 2130 may transmit to the UE DCI including a TCI state, where the indicated TCI state is associated with one of a first subset of TCI states or a second subset of TCI states. In some cases, an MSB of the indicated TCI state indicates whether the indicated TCI state belongs to the first subset of TCI states or the second subset of TCI states.

Beam switching manager 2135 may trigger, based on the first indication and whether the indicated TCI state belongs to the first subset of TCI states or the second subset of TCI states, a first beam switching operation or a second beam switching operation, where the first beam switching operation includes data beam switching and the second beam switching operation includes data beam switching and control beam switching. In some cases, the control beam switching of the second beam switching operation includes setting a QCL relationship between reference signals of the downlink control channel and a reference signal set corresponding to the indicated TCI state.

Transmitter 2120 may transmit signals generated by other components of the device. In some examples, the transmitter 2120 may be collocated with a receiver 2110 in a transceiver module. For example, the transmitter 2120 may be an example of aspects of the transceiver 2335 described with reference to FIG. 23. The transmitter 2120 may utilize a single antenna or a set of antennas.

Figure 22:
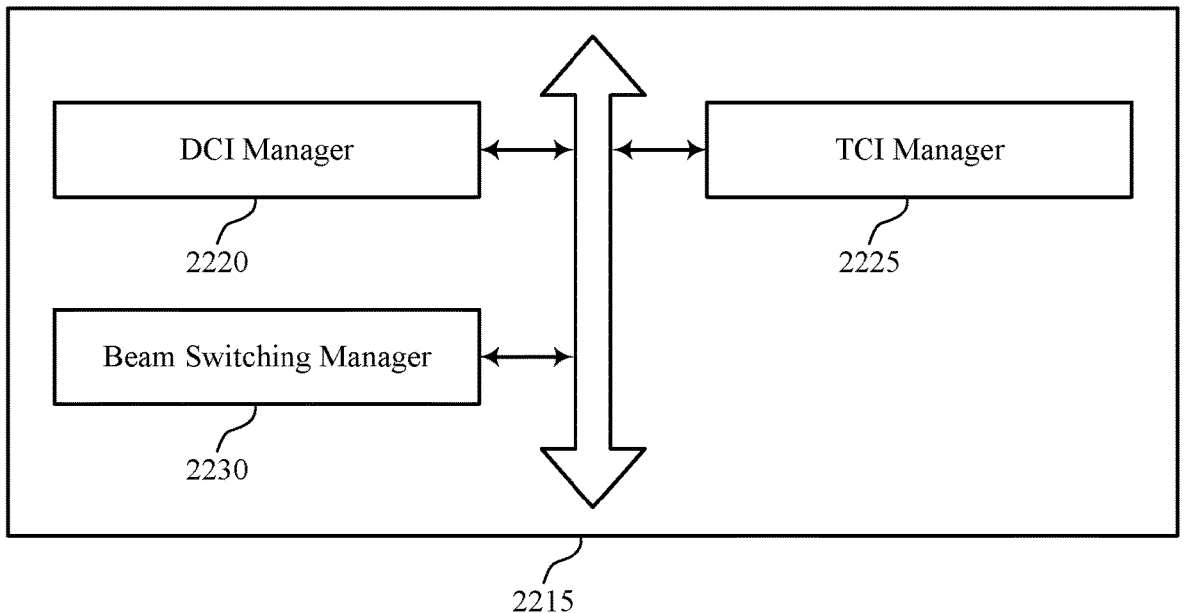

FIG. 22 shows a block diagram 2200 of a base station communications manager 2215 that supports TCI based beam switching in accordance with aspects of the present disclosure. The base station communications manager 2215 may be an example of aspects of a base station communications manager 2315 described with reference to FIGS. 20, 21, and 23. The base station communications manager 2215 may include DCI manager 2220, TCI manager 2225, and beam switching manager 2230. Each of these modules may communicate, directly or indirectly, with one another (e.g., via one or more buses).

DCI manager 2220 may transmit to a UE a first indication that DCI-based control beam switching is enabled and transmit to the UE a second indication that TCI state information in DCI is enabled, where triggering the first beam switching operation or the second beam switching operation is further based on the second indication. In some cases, at least one of the first indication or the second indication is transmitted using RRC signaling or a MAC-CE.

TCI manager 2225 may transmit to the UE DCI indicating a TCI state, where the indicated TCI state is associated with a data beam switch (e.g., a first subset of TCI states) or both a control beam switch and a data beam switch (e.g., a second subset of TCI states). In some cases, an MSB of the indicated TCI state indicates whether the indicated TCI state belongs to the first subset of TCI states or the second subset of TCI states (e.g., where the first subset of TCI states are associated with the data beam switch and the second subset of TCI states are associated with both the control beam switch and the data beam switch).

Beam switching manager 2230 may trigger, based on the first indication and whether the indicated TCI state belongs to the first subset of TCI states or the second subset of TCI states, a first beam switching operation or a second beam switching operation, where the first beam switching operation includes data beam switching and the second beam switching operation includes data beam switching and control beam switching. In some cases, the control beam switching of the second beam switching operation includes setting a QCL relationship between reference signals of the downlink control channel and a reference signal set corresponding to the indicated TCI state.

Figure 23:
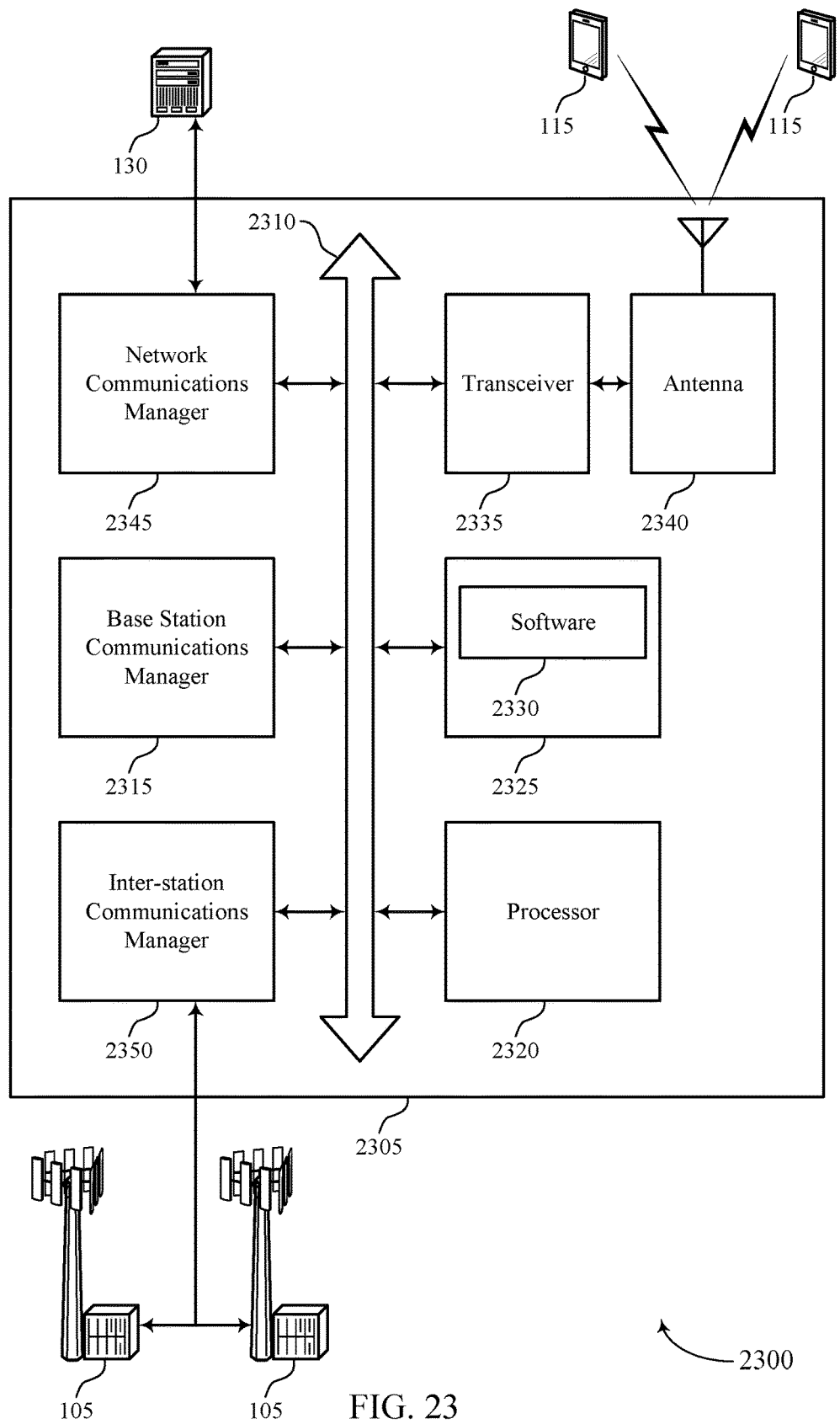
FIG. 23 illustrates a block diagram of a system including a base station that supports TCI based beam switching in accordance with aspects of the present disclosure.

FIG. 23 shows a diagram of a system 2300 including a device 2305 that supports TCI based beam switching in accordance with aspects of the present disclosure. Device 2305 may be an example of or include the components of base station 105 as described above, e.g., with reference to FIG. 1. Device 2305 may include components for bi-directional voice and data communications including components for transmitting and receiving communications, including base station communications manager 2315, processor 2320, memory 2325, software 2330, transceiver 2335, antenna 2340, network communications manager 2345, and inter-station communications manager 2350. These components may be in electronic communication via one or more buses (e.g., bus 2310). Device 2305 may communicate wirelessly with one or more UEs 115.

Processor 2320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 2320 may be configured to operate a memory array using a memory controller. In other cases, a memory controller may be integrated into processor 2320. Processor 2320 may be configured to execute computer-readable instructions stored in a memory to perform various functions (e.g., functions or tasks supporting TCI based beam switching).

Memory 2325 may include RAM and ROM. The memory 2325 may store computer-readable, computer-executable software 2330 including instructions that, when executed, cause the processor to perform various functions described herein. In some cases, the memory 2325 may contain, among other things, a BIOS which may control basic hardware or software operation such as the interaction with peripheral components or devices.

Software 2330 may include code to implement aspects of the present disclosure, including code to support TCI based beam switching. Software 2330 may be stored in a non-transitory computer-readable medium such as system memory or other memory. In some cases, the software 2330 may not be directly executable by the processor but may cause a computer (e.g., when compiled and executed) to perform functions described herein.

Transceiver 2335 may communicate bi-directionally, via one or more antennas, wired, or wireless links as described above. For example, the transceiver 2335 may represent a wireless transceiver and may communicate bi-directionally with another wireless transceiver. The transceiver 2335 may also include a modem to modulate the packets and provide the modulated packets to the antennas for transmission, and to demodulate packets received from the antennas.

In some cases, the wireless device may include a single antenna 2340. However, in some cases the device may have more than one antenna 2340, which may be capable of concurrently transmitting or receiving multiple wireless transmissions.

Network communications manager 2345 may manage communications with the core network (e.g., via one or more wired backhaul links). For example, the network communications manager 2345 may manage the transfer of data communications for client devices, such as one or more UEs 115.

Inter-station communications manager 2350 may manage communications with other base station 105, and may include a controller or scheduler for controlling communications with UEs 115 in cooperation with other base stations 105. For example, the inter-station communications manager 2350 may coordinate scheduling for transmissions to UEs 115 for various interference mitigation techniques such as beamforming or joint transmission. In some examples, inter-station communications manager 2350 may provide an X2 interface within an LTE or LTE-A wireless communication network technology to provide communication between base stations 105.

Figure 24:
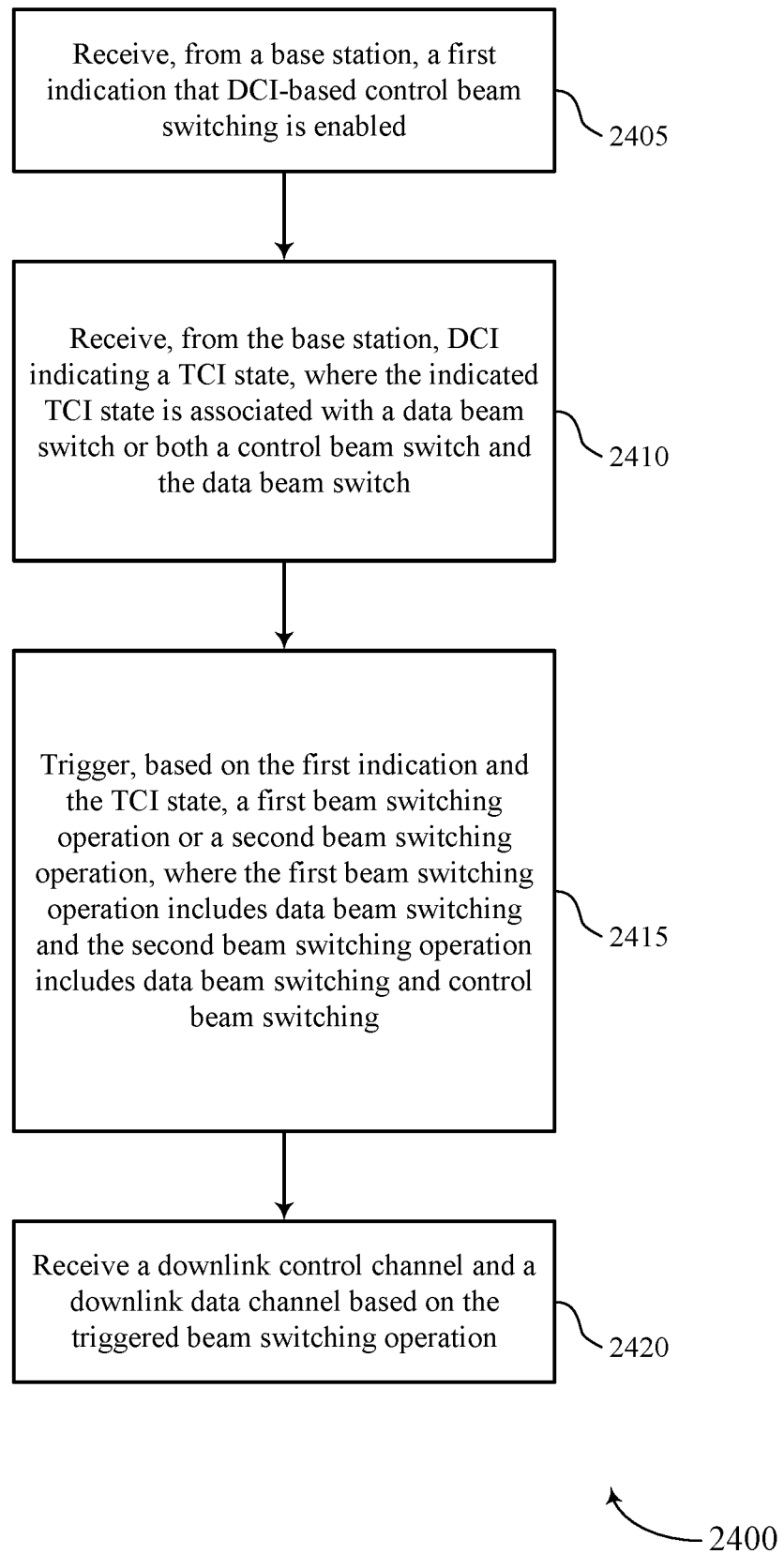
FIGS. 24 through 25 show flowcharts illustrating methods for TCI based beam switching in accordance with aspects of the present disclosure.

FIG. 24 shows a flowchart illustrating a method 2400 for TCI based beam switching in accordance with aspects of the present disclosure. The operations of method 2400 may be implemented by a UE 115 or its components as described herein. For example, the operations of method 2400 may be performed by a UE communications manager as described with reference to FIGS. 16 through 19. In some examples, a UE 115 may execute a set of codes to control the functional elements of the device to perform the functions described below. Additionally or alternatively, the UE 115 may perform aspects of the functions described below using special-purpose hardware.

At 2405 the UE 115 may receive, from a base station, a first indication that DCI-based control beam switching is enabled. The operations of 2405 may be performed according to the methods described herein. In certain examples, aspects of the operations of 2405 may be performed by a DCI manager as described with reference to FIGS. 16 through 19.

At 2410 the UE 115 may receive, from the base station, DCI indicating a TCI state, where the indicated TCI state is associated with a data beam switch or both a control beam switch and the data control beam switch. The operations of 2410 may be performed according to the methods described herein. In certain examples, aspects of the operations of 2410 may be performed by a TCI manager as described with reference to FIGS. 16 through 19.

At 2415 the UE 115 may trigger, based on the first indication and the TCI state, a first beam switching operation or a second beam switching operation. In some cases, the first beam switching operation comprises data beam switching and the second beam switching operation comprises data beam switching and control beam switching. The operations of 2415 may be performed according to the methods described herein. In certain examples, aspects of the operations of 2415 may be performed by a beam switching manager as described with reference to FIGS. 16 through 19.

At 2420 the UE 115 may receive a downlink control channel and a downlink data channel based on the triggered beam switching operation. The operations of 2420 may be performed according to the methods described herein. In certain examples, aspects of the operations of 2420 may be performed by a receiver as described with reference to FIGS. 16 through 19.

Figure 25:
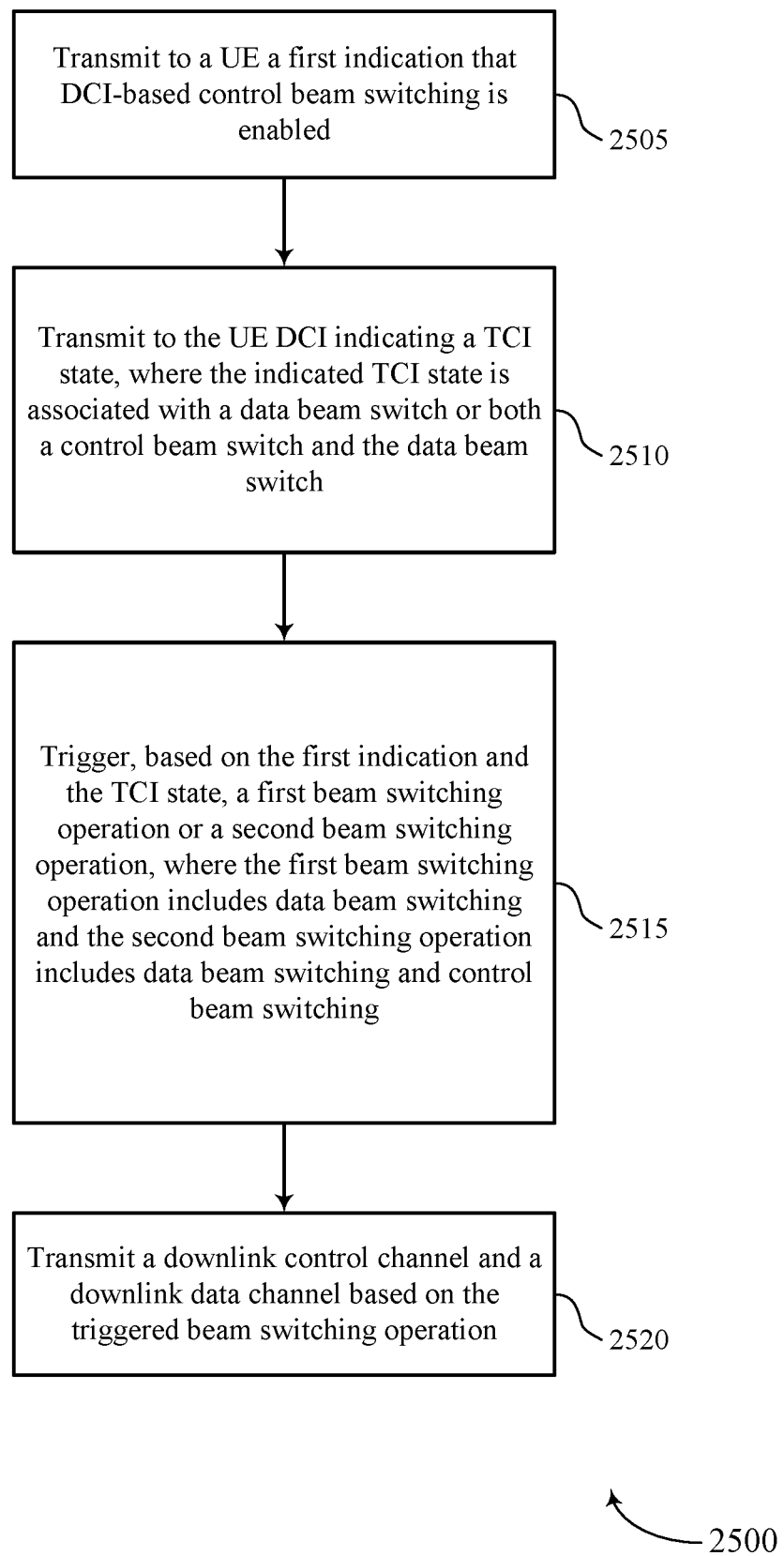

FIG. 25 shows a flowchart illustrating a method 2500 for TCI based beam switching in accordance with aspects of the present disclosure. The operations of method 2500 may be implemented by a base station 105 or its components as described herein. For example, the operations of method 2500 may be performed by a base station communications manager as described with reference to FIGS. 20 through 23. In some examples, a base station 105 may execute a set of codes to control the functional elements of the device to perform the functions described below. Additionally or alternatively, the base station 105 may perform aspects of the functions described below using special-purpose hardware.

At 2505 the base station 105 may transmit to a UE a first indication that DCI-based control beam switching is enabled. The operations of 2505 may be performed according to the methods described herein. In certain examples, aspects of the operations of 2505 may be performed by a DCI manager as described with reference to FIGS. 20 through 23.

At 2510 the base station 105 may transmit to the UE DCI indicating a TCI state, where the indicated TCI state is associated with a data beam switch or both a control beam switch and the data beam switch. The operations of 2510 may be performed according to the methods described herein. In certain examples, aspects of the operations of 2510 may be performed by a TCI manager as described with reference to FIGS. 20 through 23.

At 2515 the base station 105 may trigger, based on the first indication and the TCI state, a first beam switching operation or a second beam switching operation. In some cases, the first beam switching operation comprises data beam switching and the second beam switching operation comprises data beam switching and control beam switching. The operations of 2515 may be performed according to the methods described herein. In certain examples, aspects of the operations of 2515 may be performed by a beam switching manager as described with reference to FIGS. 20 through 23.

At 2520 the base station 105 may transmit a downlink control channel and a downlink data channel based on the triggered beam switching operation. The operations of 2520 may be performed according to the methods described herein. In certain examples, aspects of the operations of 2520 may be performed by a transmitter as described with reference to FIGS. 20 through 23.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1X, 1X, etc. IS-856 (TIA-856) is commonly referred to as CDMA2000 1x EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving, from a base station, a first indication that downlink control information (DCI)-based control beam switching is enabled;
   receiving, from the base station, downlink control information (DCI) indicating a transmission configuration indication (TCI) state, wherein the indicated TCI state is associated with a data beam switch or both a control beam switch and the data beam switch;

triggering, based at least in part on the first indication and the TCI state, a first beam switching operation or a second beam switching operation, wherein the first beam switching operation comprises data beam switching and the second beam switching operation comprises data beam switching and control beam switching; and receiving a downlink control channel and a downlink data channel based at least in part on the triggered beam switching operation.

2. The method of claim 1, wherein the control beam switching of the second beam switching operation comprises:

identifying a quasi-collocation (QCL) relationship between reference signals of the downlink control channel and a reference signal set corresponding to the indicated TCI state.

3. The method of claim 1, further comprising:

determining whether the indicated TCI state belongs to a first subset of TCI states or a second subset of TCI states based at least in part on a most significant bit (MSB) of the indicated TCI state, wherein the first subset of TCI states are associated with the data beam switch and the second subset of TCI states are associated with both the control beam switch and the data beam switch.

4. The method of claim 1, further comprising:

receiving, from the base station, a second indication that TCI state information in DCI is enabled; and triggering the first beam switching operation or the second beam switching operation is further based at least in part on the second indication.

5. The method of claim 4, wherein at least one of the first indication or the second indication is received in radio resource control (RRC) signaling or in a media access control (MAC) control element (MAC-CE).

6. The method of claim 1, further comprising:

refraining from performing the second beam switching operation for a period of time defined by a threshold control offset parameter.

7. The method of claim 6, further comprising:

receiving the threshold control offset parameter from the base station.

8. The method of claim 6, further comprising:

transmitting an acknowledgment (ACK) or negative acknowledgment (NACK) message for the received DCI, wherein a beginning of the period of time is defined by a transmission time of the ACK or NACK message for the received DCI.

9. The method of claim 1, wherein the control beam switching of the second beam switching operation comprises:

identifying a quasi-collocation (QCL) relationship between an aperiodic channel state information reference signal (CSI-RS) and a reference signal set corresponding to the indicated TCI state.

10. A method for wireless communication at a base station, comprising:

transmitting to a user equipment (UE) a first indication that downlink control information (DCI)-based control beam switching is enabled;

transmitting to the UE downlink control information (DCI) indicating a transmission configuration indication (TCI) state, wherein the indicated TCI state is associated with a data beam switch or both a control beam switch and the data beam switch;

triggering, based at least in part on the first indication and the TCI state, a first beam switching operation or a second beam switching operation, wherein the first beam switching operation comprises data beam switching and the second beam switching operation comprises data beam switching and control beam switching; and transmitting a downlink control channel and a downlink data channel based at least in part on the triggered beam switching operation.

11. The method of claim 10, wherein the control beam switching of the second beam switching operation comprises:

setting a quasi-collocation (QCL) relationship between reference signals of the downlink control channel and a reference signal set corresponding to the indicated TCI state.

12. The method of claim 10, wherein a most significant bit (MSB) of the indicated TCI state indicates whether the indicated TCI state belongs to a first subset of TCI states or a second subset of TCI states, wherein the first subset of TCI states are associated with the data beam switch and the second subset of TCI states are associated with both the control beam switch and the data beam switch.

13. The method of claim 10, further comprising:

transmitting to the UE a second indication that TCI state information in DCI is enabled, wherein triggering the first beam switching operation or the second beam switching operation is further based at least in part on the second indication.

14. The method of claim 13, wherein at least one of the first indication or the second indication is transmitted using radio resource control (RRC) signaling or a media access control (MAC) control element (MAC-CE).

15. The method of claim 10, wherein the control beam switching of the second beam switching operation comprises:

setting a quasi-collocation (QCL) relationship between an aperiodic channel state information reference signal (CSI-RS) and a reference signal set corresponding to the indicated TCI state.

16. An apparatus for wireless communication at a user equipment (UE), comprising:

a processor;

memory in electronic communication with the processor; and instructions stored in the memory and executable by the processor to cause the apparatus to:

receive, from a base station, a first indication that downlink control information (DCI)-based control beam switching is enabled;

receive, from the base station, downlink control information (DCI) indicating a transmission configuration indication (TCI) state, wherein the indicated TCI state is associated with a data beam switch or both a control beam switch and the data beam switch;

trigger, based at least in part on the first indication and the TCI state, a first beam switching operation or a second beam switching operation, wherein the first beam switching operation comprises data beam switching and the second beam switching operation comprises data beam switching and control beam switching; and receive a downlink control channel and a downlink data channel based at least in part on the triggered beam switching operation.

17. The apparatus of claim 16, wherein the instructions to the control beam switching of the second beam switching operation are executable by the processor to cause the apparatus to:

identify a quasi-collocation (QCL) relationship between reference signals of the downlink control channel and a reference signal set corresponding to the indicated TCI state.

18. The apparatus of claim 16, wherein the instructions are further executable by the processor to cause the apparatus to:
determine whether the indicated TCI state belongs to a first subset of TCI states or a second subset of TCI states based at least in part on a most significant bit (MSB) of the indicated TCI state, wherein the first subset of TCI states are associated with the data beam switch and the second subset of TCI states are associated with both the control beam switch and the data beam switch.

19. The apparatus of claim 16, wherein the instructions are further executable by the processor to cause the apparatus to:
receive, from the base station, a second indication that TCI state information in DCI is enabled; and
trigger the first beam switching operation or the second beam switching operation is further based at least in part on the second indication.

20. The apparatus of claim 19, wherein at least one of the first indication or the second indication is received in radio resource control (RRC) signaling or in a media access control (MAC) control element (MAC-CE).

21. The apparatus of claim 16, wherein the instructions are further executable by the processor to cause the apparatus to:
refrain from performing the second beam switching operation for a period of time defined by a threshold control offset parameter.

22. The apparatus of claim 21, wherein the instructions are further executable by the processor to cause the apparatus to:
receive the threshold control offset parameter from the base station.

23. The apparatus of claim 21, wherein the instructions are further executable by the processor to cause the apparatus to:
transmit an acknowledgment (ACK) or negative acknowledgment (NACK) message for the received DCI, wherein a beginning of the period of time is defined by a transmission time of the ACK or NACK message for the received DCI.

24. The apparatus of claim 16, wherein the instructions to the control beam switching of the second beam switching operation are executable by the processor to cause the apparatus to:
identify a quasi-collocation (QCL) relationship between an aperiodic channel state information reference signal (CSI-RS) and a reference signal set corresponding to the indicated TCI state.

25. An apparatus for wireless communication at a base station, comprising:
a processor;
memory in electronic communication with the processor; and
instructions stored in the memory and executable by the processor to cause the apparatus to:
transmit to a user equipment (UE) a first indication that downlink control information (DCI)-based control beam switching is enabled;
transmit to the UE downlink control information (DCI) indicating a transmission configuration indication (TCI) state, wherein the indicated TCI state is associated with a data beam switch or both a control beam switch and the data beam switch;
trigger, based at least in part on the first indication and the TCI state, a first beam switching operation or a second beam switching operation, wherein the first beam switching operation comprises data beam switching and the second beam switching operation comprises data beam switching and control beam switching; and
transmit a downlink control channel and a downlink data channel based at least in part on the triggered beam switching operation.

26. The apparatus of claim 25, wherein the instructions to the control beam switching of the second beam switching operation are executable by the processor to cause the apparatus to:
set a quasi-collocation (QCL) relationship between reference signals of the downlink control channel and a reference signal set corresponding to the indicated TCI state.

27. The apparatus of claim 25, wherein a most significant bit (MSB) of the indicated TCI state indicates whether the indicated TCI state belongs to a first subset of TCI states or a second subset of TCI states, wherein the first subset of TCI states are associated with the data beam switch and the second subset of TCI states are associated with both the control beam switch and the data beam switch.

28. The apparatus of claim 25, wherein the instructions are further executable by the processor to cause the apparatus to:
transmit to the UE a second indication that TCI state information in DCI is enabled, wherein triggering the first beam switching operation or the second beam switching operation is further based at least in part on the second indication.

29. The apparatus of claim 28, wherein at least one of the first indication or the second indication is transmitted using radio resource control (RRC) signaling or a media access control (MAC) control element (MAC-CE).

30. The apparatus of claim 25, wherein the instructions to the control beam switching of the second beam switching operation are executable by the processor to cause the apparatus to:
set a quasi-collocation (QCL) relationship between an aperiodic channel state information reference signal (CSI-RS) and a reference signal set corresponding to the indicated TCI state.

* * * * *